United States Patent
Dhammawat et al.

(10) Patent No.: US 11,553,371 B2
(45) Date of Patent: Jan. 10, 2023

(54) QUALITY OF SERVICE (QOS) FLOW MANAGEMENT FOR OPTIMIZING USE OF QOS RESOURCES AND SUPPORTING QOS GUARANTEES IN A PRIVATE 5G NETWORK

(71) Applicant: Cisco Technology, Inc., San Jose, CA (US)

(72) Inventors: Abhishek Dhammawat, San Jose, CA (US); Srinath Gundavelli, San Jose, CA (US); Mahesh Satyanarayana, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 259 days.

(21) Appl. No.: 17/084,150

(22) Filed: Oct. 29, 2020

(65) Prior Publication Data

US 2022/0141703 A1    May 5, 2022

(51) Int. Cl.
*H04W 28/02*    (2009.01)
*H04W 28/24*    (2009.01)
*H04W 76/20*    (2018.01)

(52) U.S. Cl.
CPC ....... *H04W 28/0268* (2013.01); *H04W 28/24* (2013.01); *H04W 76/20* (2018.02)

(58) Field of Classification Search
CPC ............. H04W 28/02; H04W 28/0231; H04W 28/0236; H04W 28/0268; H04W 28/16; H04W 28/24; H04W 76/20; H04W 76/34
See application file for complete search history.

(56) References Cited

U.S. PATENT DOCUMENTS 7,774,498 B1    8/2010 Kraemer et al.
8,194,698 B2    6/2012 Senthilnathan et al.
(Continued)

FOREIGN PATENT DOCUMENTS

TW    200931894 A  *  7/2009    ............ H04W 28/16
WO    2018145103 A1    8/2018
(Continued)

OTHER PUBLICATIONS

3GPP, "3rd Generation Partnership Project; Technical Specification Group Radio Access Network; NG-RAN; NG Application Protocol (NGAP) (Release 16)", 3GPP TS 38.413 V16.3.0, Sep. 2020, 466 pages.

(Continued)

*Primary Examiner* — Kevin D Mew

(74) *Attorney, Agent, or Firm* — Edell, Shapiro & Finnan, LLC

(57) ABSTRACT

In one illustrative example, a user plane function (UPF) may detect initial traffic for an application for a user equipment (UE) for which no current dedicated Quality of Service (QoS) flow is established. In response, the UPF may send, to a control plane function, a message which indicates a request for creating a dedicated QoS Flow for traffic for the application for the UE. The message may include flow metadata and an application identifier obtained in detecting the initial traffic. A QoS Flow may then be created for the traffic based on a selected QoS policy associated with the application identifier. Subsequently, the UPF may determine that a measured time period of traffic inactivity for the QoS Flow is outside a limit set by a threshold. Based on the (Continued)

determining, the UPF may send, to the control plane function, a message which indicates a request for deleting the QoS Flow.

27 Claims, 13 Drawing Sheets

(56) References Cited

U.S. PATENT DOCUMENTS

| | | | |
|---|---|---|---|
| 8,339,954 | B2 | 12/2012 | Dahod |
| 8,817,618 | B2 | 8/2014 | Dahod |
| 9,198,209 | B2 | 11/2015 | Grayson et al. |
| 10,785,674 | B2 | 9/2020 | Cakulev et al. |
| 11,297,530 | B2* | 4/2022 | Dao ................. H04W 8/08 |
| 2008/0008093 | A1* | 1/2008 | Wang ................. H04L 47/12 370/235 |
| 2011/0170411 | A1 | 7/2011 | Wang et al. |
| 2013/0155849 | A1 | 6/2013 | Koodli et al. |
| 2014/0056130 | A1 | 2/2014 | Grayson et al. |
| 2018/0184340 | A1 | 6/2018 | Pularikkal et al. |
| 2019/0191330 | A1* | 6/2019 | Dao ................. H04L 12/4633 |
| 2019/0253917 | A1 | 8/2019 | Dao |
| 2019/0268973 | A1 | 8/2019 | Bull et al. |
| 2020/0145876 | A1* | 5/2020 | Dao ................. H04W 80/10 |
| 2020/0236579 | A1 | 7/2020 | Cho et al. |
| 2020/0344662 | A1 | 10/2020 | Maino et al. |
| 2020/0374900 | A1* | 11/2020 | Aksu ................. H04W 72/1247 |
| 2021/0289393 | A1* | 9/2021 | Yao ................. H04L 43/0864 |

FOREIGN PATENT DOCUMENTS

| | | |
|---|---|---|
| WO | 2019158218 A1 | 8/2019 |
| WO | 2020020461 A1 | 1/2020 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.

3GPP, "3rd Generation Partnership Project; Technical Specification Group Core Network and Terminals; 5G System; Session Management Services; Stage 3 (Release 16)", 3GPP TS 29.502 V16.2.0, Dec. 2019, 211 pages.

Cisco, "Configure Policies", downloaded Oct. 28, 2020, 46 pages.

Mindel, David, "Deploying 4G/LTE for Enterprise and IoT Solutions", BRKSPM 2129, Jun. 10-14, 2018, 88 pages.

LiveAction, Inc., "Cisco QoS Handbook", 2nd Edition, downloaded Oct. 28, 2020, 58 pages.

Cisco, "Quality of Service Design Overview", downloaded Oct. 28, 2020, 34 pages.

* cited by examiner

| APN/DNN | Example Services | Business Intent |
|---|---|---|
| Internet | SIP, RTP | enterprise relevant |
| Internet | Telepresence, Webex, Jabber, Facetime, Whatsapp | enterprise relevant |
| Internet | youtube | enterprise irrelevant |

| 5QI | Type Of Service | Resource Type | Default Priority Level | Packet Delay Budget | Category Of Services | Application Name |
|---|---|---|---|---|---|---|
| 1 | Voice | GBR | 20 | 100 ms | Conversational voice | SIP, RTP |
| 2 | Conversational Video | GBR | 40 | 150ms | Conversational Video | Telepresence, Webex, Jabber, Facetime, Whatsapp |
| 6 | Buffered Video | Non GBR | 60 | 300ms | Video (Buffered Streaming) | Youtube |

| 5QI | QoS Policy | Application ID / Name |
|---|---|---|
| 1 | QoS Policy 1 | ID 1 |
| 2 | QoS Policy 2 | ID 2 |
| 6 | QoS Policy 3 | ID 3 |

300

QUALITY OF SERVICE (QOS) FLOW MANAGEMENT FOR OPTIMIZING USE OF QOS RESOURCES AND SUPPORTING QOS GUARANTEES IN A PRIVATE 5G NETWORK

TECHNICAL FIELD

The present disclosure relates to telecommunication systems, and in particular, to techniques and mechanisms for Quality of Service (QoS) flow management for optimizing use of QoS resources and supporting QoS guarantees in a mobile network, such as an enterprise private Third Generation Partnership Project (3GPP) network.

BACKGROUND

An enterprise network deployment may include an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

Private 5G inherits the concept of a QoS Flow from the standard 5G System (5GS) architecture. A QoS Flow starts at a User Plane Function (UPF) and extends to a gNodeB (gNB), where it is mapped to a radio bearer/QoS Flow to a User Equipment (UE). A session at the UPF is managed by a Session Management Function (SMF) over an N4 interface using a Packet Forwarding Control Protocol (PFCP).

Each QoS Flow is associated with a particular QoS classification and treatment on an Internet Protocol (IP) or application flow basis. Parameters that define a QoS Flow include a 5G QoS Class Identifier (QCI), called 5QI, such that packets can be classified into different QoS classes. Other parameters that may define a QoS Flow include a Guaranteed Bit Rate (GBR), a Maximum Bit Rate (MBR), a Guaranteed Flow Bit Rate (GFBR), and a Packet Delay Budget (PDB).

GBR-type QoS Flows typically require high bandwidth, low latency, and high throughput. GBR-type QoS Flows with their associated radio bearers may be considered to be premium resources. As its name suggests, a GBR-type bearer guarantees that a specific minimum bit rate is always available on that bearer. However, congestion or overload in the network may result in undesirable packet drops and QoS degradation. In some cases, the UPF may be unable to guarantee the GBR/GFBR or PDB for QoS Flows due to such congestion and overload.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A is a table for representing a mapping of associations between applications, data networks, and business intents of the private 5G network, which may be provided from a network controller to the control plane function of the private 5G network;

FIG. 2B is a table for representing a mapping of associations between a plurality of application identifiers (IDs)/names associated with applications and a plurality of 5G Quality of Service (QoS) Class Identifiers (QCIs) or 5QIs associated with QoS policies;

FIG. 3 is a more simplified table for representing a mapping of associations between a plurality of application IDs associated with applications and a plurality of 5G QCIs or 5Qis associated with QoS policies;

DESCRIPTION OF EXAMPLE EMBODIMENTS

Figure 1A:
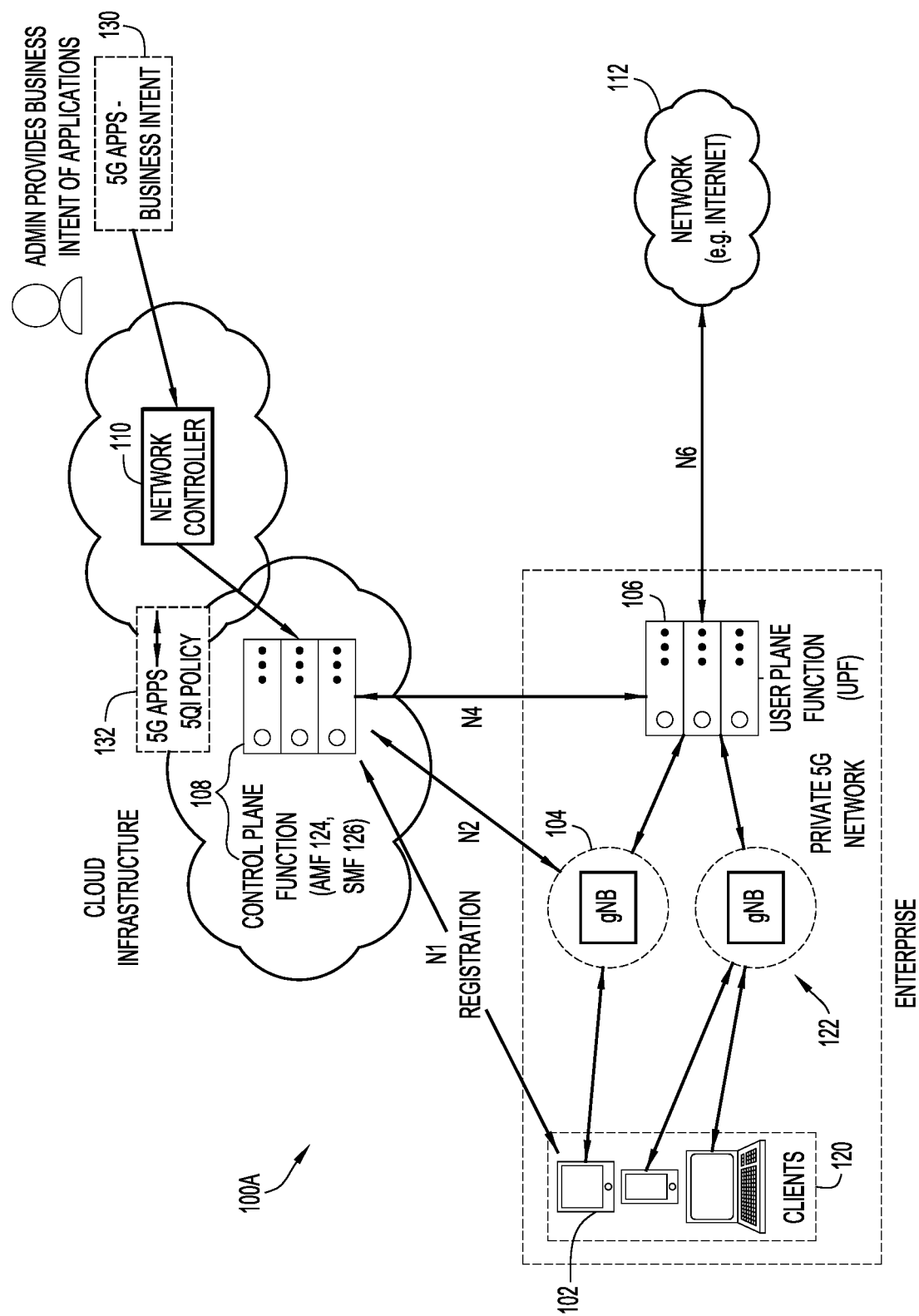
FIG. 1A is an illustrative representation of a basic network architecture of an enterprise private Third Generation Partnership Project (3GPP) network, which is (more specifically) a private Fifth Generation (5G) network, which may include a user plane function (UFP) and a control plane function which may be or include a session management function (SMF)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for Quality of Service (QoS) flow management for optimizing use of QoS resources and supporting QoS guarantees in a mobile network, such as an enterprise private Third Generation Partnership Project (3GPP) network, are described herein.

In one illustrative example, a user plane function (UPF) may perform operations for a "UPF-initiated lower-priority QoS Flow pre-emption procedure" for better support of QoS guarantees in a mobile network. In some implementations, the procedure may involve forwarding traffic for an application for a user equipment (UE) in a dedicated QoS flow, where the dedicated QoS Flow is associated with one of a Guaranteed Bit Rate (GBR), a Guaranteed Flow Bit Rate (GFBR), or a Packet Delay Budget (PDB); detecting a packet loss or delay associated with the traffic for the application for the UE in the dedicated QoS Flow to be outside a limit set by a threshold value (e.g. the GBR may have been compromised); sending, to a control plane function (e.g. a session management function or "SMF") based on the detecting, a message which indicates a request for QoS Flow handling due to flow degradation, where the message includes information associated with the dedicated QoS Flow; and receiving, from the SMF, a message which indicates a session modification request, for deleting a selected QoS Flow (e.g. a lower-priority QoS Flow) or downgrading a QoS of the selected QoS Flow.

In a corresponding illustrative example, a control plane function (e.g. the session management function or "SMF") may perform operations for the "UPF-initiated lower-priority QoS Flow pre-emption procedure" which correspond to the operations at the UPF. In some implementations, the procedure may involve managing a session at the UPF which is configured to forward traffic for an application for a UE in a dedicated QoS flow, where the dedicated QoS Flow is associated with one of a GBR, a GFBR, or a PDB; receiving, from the UPF, a message which indicates a request for QoS Flow handling due to flow degradation, where the message includes information associated with the dedicated QoS Flow and indicates that the traffic has a packet loss or delay that is outside a limit set by a threshold value (e.g. GBR may have been compromised); selecting one of a plurality of QoS Flows (e.g. a lower-priority QoS Flow) which are routed via the UPF; and sending, to the UPF, a message which indicates a session modification request for deleting the selected QoS Flow or downgrading a QoS of the selected QoS Flow.

In another illustrative example, the user plane function or UPF may perform operations for a "UPF-triggered QoS Flow creation procedure" for optimizing use of QoS resources in a mobile network. In general, the UPF may keep an active monitoring of QoS Flows (e.g. those associated with one of a GBR, GFBR, or PDB), keeping active only those QoS Flows which have traffic activity, and deleting QoS Flows that are detected to have traffic inactivity. In some implementations, the procedure may involve detecting initial traffic for an application for a UE for which no current dedicated QoS flow is established; and sending, to a control plane function (e.g. a session management function or "SMF"), a message which indicates a request for creating a dedicated QoS Flow for traffic for the application for the UE, where the message includes flow metadata and an application identifier obtained in detecting the initial traffic. The dedicated QoS Flow may then be created for the traffic for the application for the UE based on a selected QoS policy (a selected 5QI) associated with the application identifier. Here, the UPF may perform further operations for receiving, from the SMF, a message which indicates a session modification request for creating the dedicated QoS Flow for the traffic for the application for the UE, where the message includes one or more rules associated with the selected QoS policy for the dedicated QoS Flow; configuring the one or more rules for the dedicated QoS Flow for processing the traffic for the application for the UE; and sending, to the SMF, a message which indicates a session modification response. Continuing on, the UPF may perform further operations for a "UPF-triggered QoS Flow deletion procedure" for optimizing the use of the QoS resources in the mobile network. This procedure may involve determining that a measured time period of traffic inactivity for the dedicated QoS Flow is outside a limit set by a time period threshold; and based on the determining, sending, to the SMF, a message which indicates a request for deleting the dedicated QoS Flow. Here, the UPF may perform further operations for receiving, from the SMF, a message which indicates a session modification request for deleting the dedicated QoS Flow; removing the dedicated QoS Flow, which includes deleting the one or more rules for the dedicated QoS Flow; and sending, to the SMF, a message which indicates a session modification response.

In a corresponding illustrative example, a control plane function (e.g. the session management function or "SMF") may perform operations for the "UPF-triggered QoS Flow creation procedure" which correspond to the operations at the UPF. This procedure may involve receiving, from the UPF, a message which indicates a request for creating a dedicated QoS flow for traffic for an application for a UE, where the message includes flow metadata and an application identifier associated with the application; selecting one of a plurality of QoS policies (a selected 5QI) based on the application identifier; and sending, to the UPF, a message which indicates a session modification request for configuring one or more rules of the selected QoS policy at the UPF for the dedicated QoS Flow for the traffic for the application for the UE. The flow metadata and the application identifier associated with the application may be obtained from initial traffic for the application for the UE, detected at the user plane function, for which no current dedicated QoS Flow exists. The SMF may perform further operations for sending one or more radio-side messages for creating the dedicated QoS Flow which extends to the UE via a base station, including a service data flow (SDF) filter for the UE which is generated based on the flow metadata and the application identifier. Continuing on, the SMF may perform further corresponding operations for the "UPF-triggered QoS Flow deletion procedure" for optimizing use of the QoS resources in the mobile network. This procedure may involve receiving, from the UPF, a message which indicates a request for deleting the dedicated QoS Flow, which is responsive to traffic inactivity for the dedicated QoS Flow; sending, to the UPF, a message which indicates a session modification request for deleting the dedicated QoS Flow; and receiving, from the UPF, a message which indicates a session modification response.

More detailed and alternative techniques and implementations are provided herein as described below.

EXAMPLE EMBODIMENTS

As described earlier in the Background section, an enterprise network deployment may include an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

To better illustrate, FIG. 1A is an illustrative representation of a network architecture 100A of an enterprise private 3GPP network for an enterprise, which is, more specifically, a private 5G network. Relatedly, FIG. 1B shows a network architecture 100B of the private 5G network of FIG. 1A as a simplified, schematic block diagram.

Figure 1B:
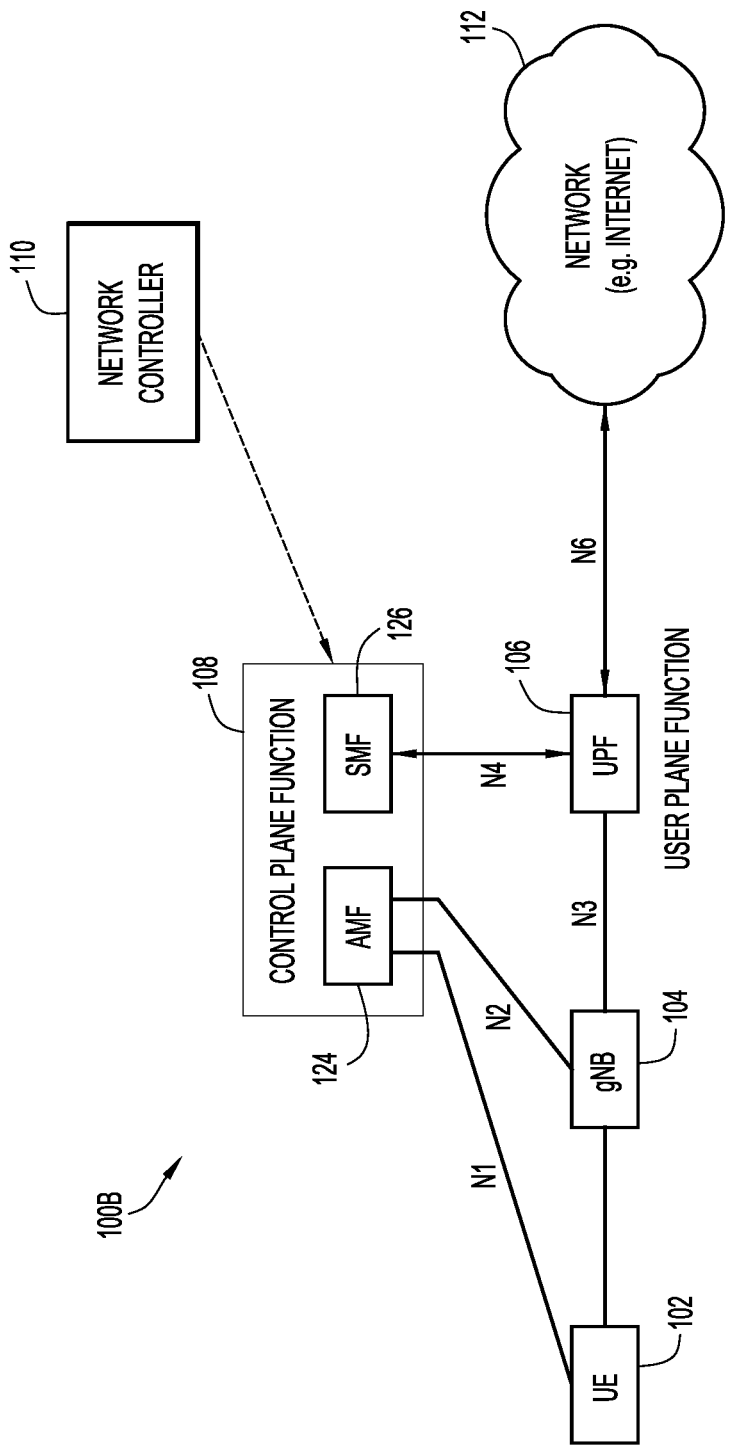
FIG. 1B shows the network architecture of the private 5G network of FIG. 1A as a simplified, schematic block diagram.

The private 5G network may utilize the network architecture 100A/100B in FIGS. 1A-1B to facilitate communications for a plurality of clients 120 or user equipment (UEs), such as a UE 102. UE 102 may be any suitable type of device, such as a cellular telephone, a smart phone, a tablet device, an IoT device, a Machine-to-Machine (M2M) device, a robotics device, and a sensor, to name but a few. UE 102 may obtain access to the private 5G network via one or more base stations or gNodeBs (gNBs) 122, such as a gNB 104. A user plane function (UPF) 106 may be used to carry traffic for an application for UE 102. For example, UPF 106 may carry uplink (UL) and downlink (DL) traffic between UE 102 operating in the private 5G network and a network 112, such as the Internet.

A control plane function(s) 108 of a control plane may be utilized in the 5G private network for access and mobility management, session management, and/or policy management and control, etc., for UEs. In particular, control plane function 108 may include an Access and Mobility Management Function (AMF) 124 and a Session Management Function (SMF) 126. AMF 124 and SMF 126 may be implemented as separate functions or components, or alternatively provided together as an integrated functionality (in whole or in part) and/or co-located at the same node or component. A session at UPF 106 may be managed by SMF 126 over an N4 interface using a Packet Forwarding Control Protocol (PFCP). In some implementations, control plane function 108 is provided locally in the private 5G network. In other implementations, control plane function 108 is provided as part of a cloud infrastructure.

Operation, functionality, and protocols utilized in the private 5G network may at least generally conform to 3GPP standards for 5G (e.g. 3GPP Technical Specifications or "TS" 23.501 and 23.502), except where adapted and described herein according to the present disclosure. A plurality of interfaces and/or reference points N1, N2, N3, N4, and N5 shown in FIGS. 1A-1B (and others) may represent the communications and/or protocols between each of the entities, as is known by the relevant (evolving) standards documents.

A network controller 110 may also be provided for managing the private 5G network. More particularly, network controller 110 may be provided in the private 5G network for managing and controlling policy and configuration in the private 5G network. In some implementations, network controller 110 is provided locally in the private 5G network. In other implementations, network controller 110 is provided as part of a cloud infrastructure. In one example, the cloud infrastructure having network controller 110 may be referred to as a cloud manager or a management cloud.

In some implementations, network controller 110 in the cloud infrastructure is operative to provide management and control over policy and configuration according to intent-based networking. The motivation of intent-based networking is to enable a user to describe in plain language what he or she wants to accomplish (e.g. the user's intent) and have the network translate the user's objective into configuration and policy changes that are automatically propagated across a heterogeneous computing environment. An intent-based network operates to abstract network complexity, automate much of the work of provisioning and managing the network typically handled by a network administrator, and assure secure operation and optimal performance of the network. In some implementations, network controller 110 in the cloud infrastructure may be or include a Cisco Digital Network Architecture (Cisco DNA™).

Private 5G inherits the concept of a QoS Flow from the standard 5G System (5GS) architecture. A QoS Flow starts at UPF 106 and extends to gNB 104, where it is mapped to a radio bearer/QoS Flow to UE 102. Each QoS Flow is associated with a particular QoS classification and treatment on an Internet Protocol (IP) or application flow basis. Parameters that define a QoS Flow include a 5G QoS Class Identifier (QCI), called 5QI, such that packets can be classified into different QoS classes. Other parameters that may define a QoS Flow include a Guaranteed Bit Rate (GBR), a Maximum Bit Rate (MBR), a Guaranteed Flow Bit Rate (GFBR), and a Packet Delay Budget (PDB).

GBR-type QoS Flows typically require high bandwidth, low latency, and high throughput. GBR-type QoS Flows with their associated radio bearers may be considered to be premium resources, especially in a limited private network. As its name suggests, a GBR-type bearer guarantees that a specific minimum bit rate is always available on that bearer. However, congestion or overload in the network may result in undesirable packet drops and QoS degradation. In some cases, UPF 106 may be unable to guarantee the GBR/GFBR or PDB for QoS Flows due to congestion and overload.

Further note that each 5G private network or system of an enterprise may have its own system level capacity. Consider a system where a data rate requirement per QoS Flow is 100 Mbps and an overall system limit is 20 Gbps. In this case, the system can provide a GBR for 200 active QoS Flows at any given time. However, the number of active sessions/QoS Flows present at a given instant will depend on the deployment model. Admission control at the SMF is unable to solve such an issue as there may be clients that require a high bandwidth and, if limited according to admission control, then the system may have scaling challenges. In one example, the system level capacity may be 64K where 200 active sessions may be present at a given time, but the number can always be exceeded if the number of active sessions/QoS Flows exceeds the estimate.

According to some implementations of the present disclosure, what is provided herein includes a "UPF-initiated lower-priority QoS Flow pre-emption procedure" for better support of QoS guarantees in the mobile network. In one illustrative example, a UPF may detect a packet loss in a GBR QoS Flow to exceed a threshold value (e.g. the GBR may be compromised) and, in response, send to the SMF a request for QoS flow handling due to flow degradation. In response, the SMF may perform an assessment and choose to delete one or more lower-priority QoS Flows routed via the UPF. Alternatively, the SMF may choose to modify a QoS profile (e.g. GBR/MBR, Priority Level, or PDB) of a lower-priority QoS flow in order to downgrade its QoS to a level that can actually be satisfied by the UPF. Using such a procedure, QoS guarantees (e.g. GBR, GBFR, and/or PDB) for higher-priority QoS Flows may be more adequately supported.

According to some additional or alternative implementations of the present disclosure, what is provided herein includes a "UPF-triggered QoS Flow creation procedure" and a "UPF-triggered QoS Flow deletion procedure" for optimizing use of QoS resources in the mobile network. Here, a UPF may keep an active monitoring of QoS Flows (e.g. those associated with one of a GBR, GFBR, or PDB), keeping active only those QoS Flows which have traffic activity, and deleting QoS Flows that are detected to have traffic inactivity. In one illustrative example, the UPF may determine that a measured time period of traffic inactivity for a dedicated QoS Flow is outside a limit set by a time period threshold, and send to the SMF a request for deleting the dedicated QoS Flow based on the determining. When traffic is again received for an application for a UE for which no current dedicated QoS flow exists, the UPF may send a request for creating a dedicated QoS Flow for the traffic with the appropriate QoS.

In some preferred implementations, what may be utilized in these procedures is a mapping of stored associations between a plurality of application identifiers (IDs) and/or names of applications (e.g. "5G applications") and 5QIs and/or corresponding QoS profiles (as well as other relevant information, if and as needed). This mapping may be stored at and/or used by the control plane function (e.g. the SMF).

To that end, with reference back to FIG. 1A, it is illustrated that information for 5G applications may be input to (e.g. by a network administrator) and sent from network controller 110 to control plane function 108 for use with the private 5G network. The information may include a mapping 130 of stored associations between applications, data networks, and business intents of the 5G private network. Control plane function 108 may obtain the information that includes mapping 130, and use this information to build or generate a mapping 132 of stored associations between a plurality of application IDs/names associated with the applications and a plurality of 5G QCIs or "5QIs" associated with QoS profiles.

To better illustrate and explain, FIG. 2A is a table 200A for representing the mapping 130 of stored associations between applications, data networks, and business intents of the 5G private network. Mapping 130 may be provided from network controller 110 to control plane function 108 for use with the private 5G network (see FIG. 1A). In this example, mapping 130 may associate applications for various services with Access Point Names (APNs) and/or Data Network Names (DNN), as well as particular intents. As indicated, the various example services associated with the applications may include Session Initiation Protocol (SIP), Real-time Transfer Protocol (RTP), Telepresence, WebEx, Jabber, Facetime, WhatsApp, and YouTube. The business intents may include whether or not the service is enterprise relevant or enterprise irrelevant.

FIG. 2B is a table 200B for representing the mapping 132 of stored associations between a plurality of application IDs/names associated with the applications and a plurality of 5QIs (as well as additional information). Each one of the plurality of 5QIs may be associated with a respective one of a plurality of different QoS profiles. Mapping 132 of table 200B in FIG. 2B may be stored at control plane function 108 for use with the private 5G network (see FIG. 1A). In FIG. 2B, each entry for an application ID/name (e.g. SIP, RTP, Telepresence, WebEx, Jabber, Facetime, WhatsApp, or YouTube) may be associated with a unique 5QI and correspondingly a unique QoS profile, associated with a type of service (e.g. voice, conversational video, or buffered video), a resource type (e.g. GBR or non-GBR), a default priority level (e.g. 20, 40, or 60), a PDB (e.g. 100 ms, 150 ms, or 300 ms), and a category of service (conversational voice, conversational video, or video—buffered streaming.

FIG. 3 is a more simplified table 300 for representing the mapping 132 of stored associations between a plurality of application IDs/names (e.g. ID 1, ID 2, and ID 3 etc.) associated with applications and a plurality of 5QIs (e.g. 1, 2, 6, etc.) associated with the QoS profiles. Mapping 132 in table 300 of FIG. 3 may be stored at control plane function 108 for use with the private 5G network (see FIG. 1A). Again, each of the plurality of 5QIs (e.g. 1, 2, 6, etc.) may be associated with a respective one of a plurality of different QoS profiles (e.g. QoS profile 1, QoS profile 2, QoS profile 3, etc.).

A QoS Flow may either be GBR or Non-GBR depending on its QoS profile. The QoS profile of a QoS Flow may be or include a plurality of QoS parameters: a 5QI; an Allocation and Retention Priority (ARP); for each Non-GBR QoS Flow, a Reflective QoS Attribute (RQA); for each GBR QoS Flow, a GFBR (for UL and DL), and a Maximum Flow Bit Rate (MFBR) (for UL and DL); in the case of a GBR QoS Flow, a notification control, and a Maximum Packet Loss Rate (for UL and DL). Each QoS profile may have one corresponding QFI which is not included in the QoS profile itself. As used herein, a QoS profile may refer to one or more QoS parameters or values that are relevant depending on the context.

As mentioned earlier above, according to some implementations, what is provided herein includes a "UPF-initiated lower-priority QoS Flow pre-emption procedure" for better support of QoS guarantees in a mobile network. Such a procedure may be described in relation to FIGS. 4, 5, and 6.

Figure 4:
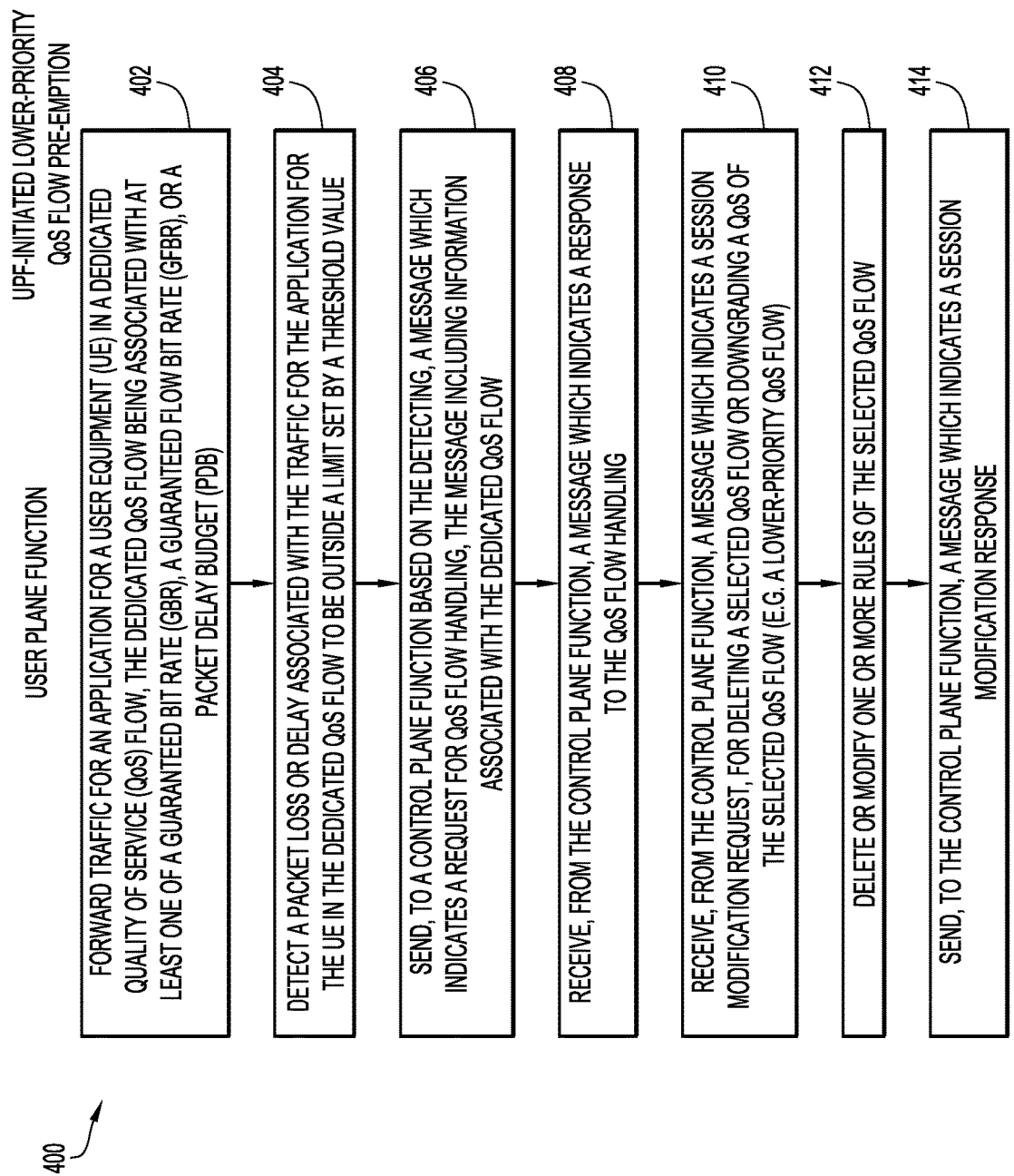
FIG. 4 is a flowchart for describing a method of QoS resource management for supporting QoS guarantees in a mobile network (e.g. an enterprise private 3GPP based network) according to some implementations of the present disclosure, which may be performed at a user plane function (UPF) (e.g. as part of a UPF-initiated lower-priority QoS Flow pre-emption procedure)

FIG. 4 is a flowchart 400 for describing a method of QoS resource management for supporting QoS guarantees in a mobile network (e.g. an enterprise private 3GPP based network) according to some implementations of the present disclosure. In some implementations, the method of FIG. 4 may be and/or be referred to as a UPF-initiated lower-priority QoS Flow pre-emption procedure. The method of FIG. 4 may be performed by a computing device or a network node configured to connect in a network for communication, to operate as a user plane function (e.g. UPF). In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the user plane function, UPF, or other function.

In the flowchart 400 of FIG. 4, the user plane function may operate to forward traffic for an application for a UE in a dedicated QoS Flow (step 402 of FIG. 4). The dedicated QoS Flow may be associated with at least one of a GBR, a GFBR, or a PDB. Sometime during operation, the user plane function may detect a packet loss or delay associated with the traffic that is outside a limit set by a threshold value (step 404 of FIG. 4). In some implementations, the user plane function may determine, based on the detecting, that the GBR, GBFR, or PDB of the dedicated QoS Flow may have been (or e.g. has been) compromised. The determination may be indicative of congestion or overload at the user plane function. Step 404 may include a determination that the QoS Flow itself is being maintained within its own limit (e.g. within its GBR limit).

In response, the user plane function may send, to a control plane function (e.g. the SMF) based on the detecting, a message which indicates a request for QoS Flow handling due to flow degradation (step 406 of FIG. 4). In some implementations, the request may indicate or be referred to as a flow degradation notification. The message may include information associated with the dedicated QoS Flow. In some implementations, the information in the message of step 406 may include at least a QFI associated with the dedicated QoS Flow. In response to sending the message in step 406, the user plane function may receive, from the control plane function, a message which indicates a response to the QoS Flow handling (step 408 of FIG. 4). In some implementations, the message of step 408 may merely serve as a simple acknowledgement to the message of step 406. In other implementations, the message of step 408 may include information associated with the packet loss or delay, for example, at least one of a cause of the packet loss or delay or an identifier of an offending QoS Flow at the user plane function.

In some implementations, the information in the message of step 406 may additionally or alternatively include one or more values indicative of the packet loss or delay of the traffic, where the control plane function may determine, based on the one or more received values, that the GBR, GBFR, or PDB of the dedicated QoS Flow may have been (or e.g. has been) compromised. Again, this determination may include a determination that the QoS Flow itself is being maintained within its own limit (e.g. within its GBR limit).

In response to a determination that the GBR, GBFR, or PDB of the dedicated QoS Flow may have been (or e.g. has been) compromised, the control plane function may select one of a plurality of (other) QoS Flows routed via the user plane function, for deletion or for modification (downgrading or lowering) of its QoS. In one example, the control plane function may select a lower-priority QoS Flow that has a lower priority than the dedicated QoS Flow and/or other QoS Flows routed via the user plane function.

For the QoS Flow handling, the user plane function may receive, from the control plane function, a message which indicates a session modification request for deleting the selected QoS Flow or downgrading the QoS of the selected QoS Flow (step 410 of FIG. 4). In response, the user plane function may delete or modify one or more rules of the selected QoS Flow (step 412 of FIG. 4). The user plane function may send, to the control plane function, a message which indicates a session modification response (step 414 of FIG. 4). The deleting or downgrading of the selected QoS Flow may serve to alleviate or reduce the congestion or overload condition at the user plane function. In preferred cases, the deleting or downgrading of the selected (e.g. lower-priority) QoS Flow serves to reduce or eliminate the flow degradation of the dedicated QoS Flow.

As described above, the control plane function may select a lower-priority QoS Flow that has a lower priority than the dedicated QoS Flow and/or the other QoS Flows routed via the user plane function. In one illustrative example, the plurality of QoS Flows may be respectively associated with a plurality of priority levels, where the selecting is performed according to the plurality of priority levels. In another illustrative example, the plurality of QoS Flows may be respectively associated with a plurality of allocation and retention priority (ARP) values, where the selecting is performed according to the plurality of ARP values (e.g. the priority levels or "PLs"). Here, in some implementations, the QoS Flow associated with the lowest priority may be selected for deletion or for modification (downgrading or lowering) of its QoS.

Figure 5:
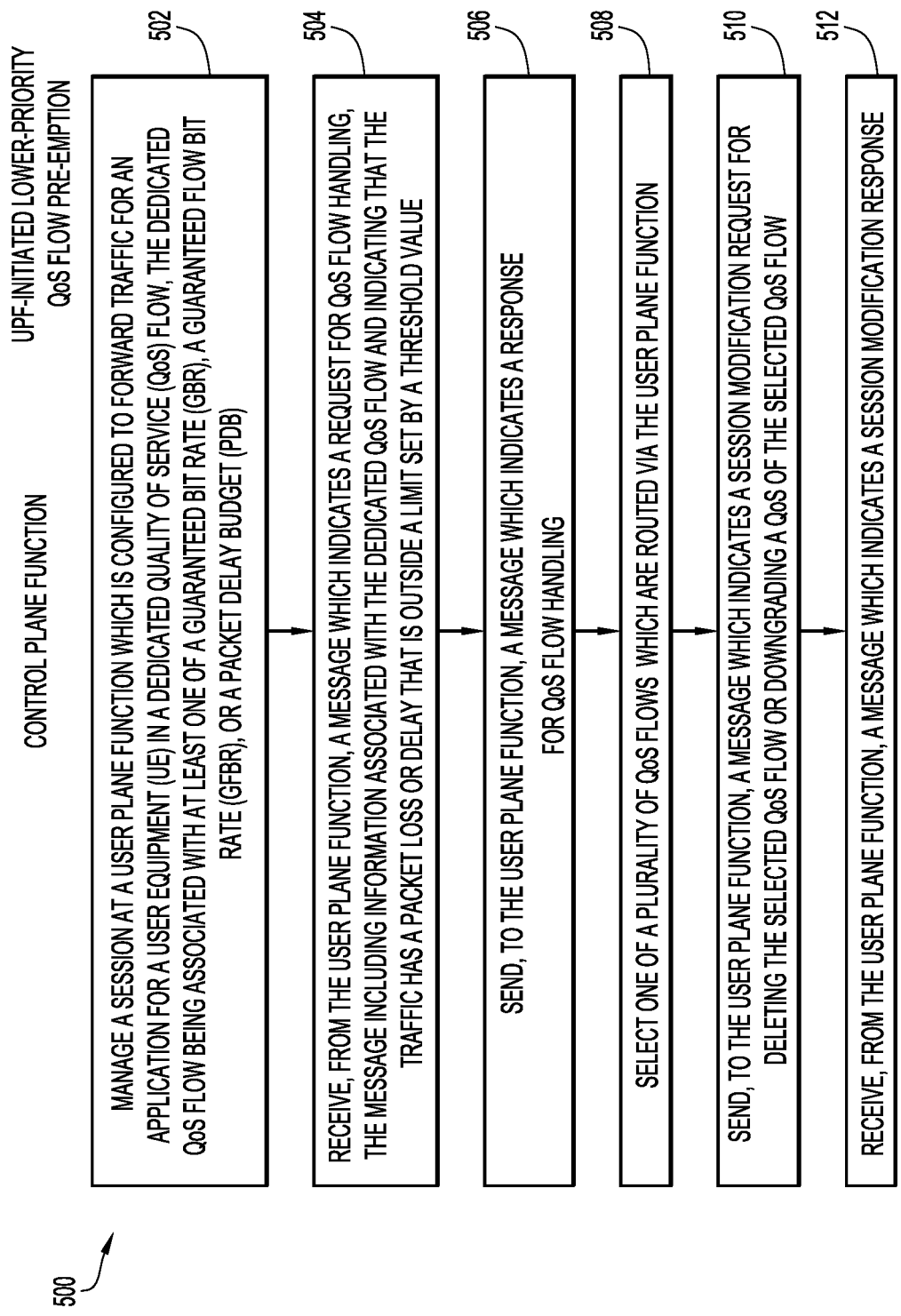
FIG. 5 is a flowchart for describing a method of QoS resource management for supporting QoS guarantees in a mobile network (e.g. an enterprise private 3GPP based network) according to some implementations of the present disclosure, which may be performed at a control plane function (e.g. a session management function or "SMF") in cooperation with the method at the UPF of FIG. 4 (e.g. as part of a UPF-initiated lower-priority QoS Flow pre-emption procedure)

FIG. 5 is a flowchart 500 for describing a method of QoS resource management for supporting QoS guarantees in a mobile network (e.g. an enterprise private 3GPP based network) according to some implementations of the present disclosure. In some implementations, the method of FIG. 5 may be and/or be referred to as a UPF-initiated lower-priority QoS Flow pre-emption procedure. The method of FIG. 5 may be performed by a computing device or a network node configured to connect in a network for commmunication, to operate as a control plane function (e.g. an SMF). The method of FIG. 5 which may be performed by the control plane function may be a corresponding method to the method of FIG. 4 which may be performed by the user plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the control plane function, SMF, or other function.

In the flowchart 500 of FIG. 5, the control plane function may manage a session at a user plane function which is configured to forward traffic for an application for a UE in a dedicated QoS Flow (step 502 of FIG. 5). The dedicated QoS Flow may be associated with at least one of a GBR, a GFBR, or a PDB. The control plane function may receive, from the user plane function, a message which indicates a request for QoS Flow handling due to flow degradation (step 504 of FIG. 5). In some implementations, the request may indicate or be referred to as a flow degradation notification. The message may include information associated with the dedicated QoS Flow (e.g. the QFI), and indicate that the traffic has a packet loss or delay that is outside a limit set by a threshold value. In some implementations, the message may indicate that the GBR, GBFR, or PDB of the dedicated QoS Flow may have been (or e.g. has been) compromised (e.g. for a QoS Flow that is being maintained within its own limit). This indication may be indicative of congestion or overload at the user plane function. In other implementations, the information in the message of step 504 may additionally or alternatively include one or more values indicative of the packet loss or delay of the traffic, where the control plane function may determine, based on the one or more received values, that the GBR, GBFR, or PDB of the dedicated QoS Flow may have been (or e.g. has been) compromised. Again, this determination may include a determination that the QoS Flow itself is being maintained within its own limit (e.g. within its GBR limit). In response to step 504, the control plane function may send, to the user plane function, a message which indicates a response for the QoS Flow handling (step 506 of FIG. 5). In some implementations, the message of step 506 may merely serve as an acknowledgement to the message of step 504.

In response to a determination that the GBR, GBFR, or PDB of the dedicated QoS Flow may have been (or e.g. has been) compromised (e.g. for a QoS Flow that is maintained within its own limit), the control plane function may select one of a plurality of QoS Flows which are routed via the user plane function (step 508 of FIG. 5). In one example, the control plane function may select a lower-priority QoS Flow that has a lower priority than the dedicated QoS Flow and/or other QoS Flows routed via the user plane function. The control plane function may send, to the user plane function, a message which indicates a session modification request for deleting the selected QoS Flow or for modifying (downgrading or lowering) a QoS of the selected QoS Flow (step 510 of FIG. 5). The control plane function may receive, from the user plane function, a message which indicates a session modification response (step 512 of FIG. 5). The deleting or downgrading of the selected QoS Flow may serve to alleviate or reduce the congestion or overload condition at the user plane function. In preferred cases, the deleting or downgrading of the selected (e.g. lower-priority) QoS Flow serves to reduce or eliminate the flow degradation of the dedicated QoS Flow.

As described in relation to step 508 of FIG. 5, the control plane function may select a lower-priority QoS Flow that has a lower priority than the dedicated QoS Flow and/or the other QoS Flows routed via the user plane function. In one illustrative example, the plurality of QoS Flows may be respectively associated with a plurality of priority levels, where the selecting is performed according to the plurality of priority levels. In another illustrative example, the plurality of QoS Flows may be respectively associated with a plurality of ARP values, where the selecting is performed according to the plurality of ARP values (e.g. the priority levels or "PLs"). Here, in some implementations, the QoS Flow associated with the lowest priority may be selected for deletion or for modification (downgrading or lowering) of its QoS.

Figure 6:
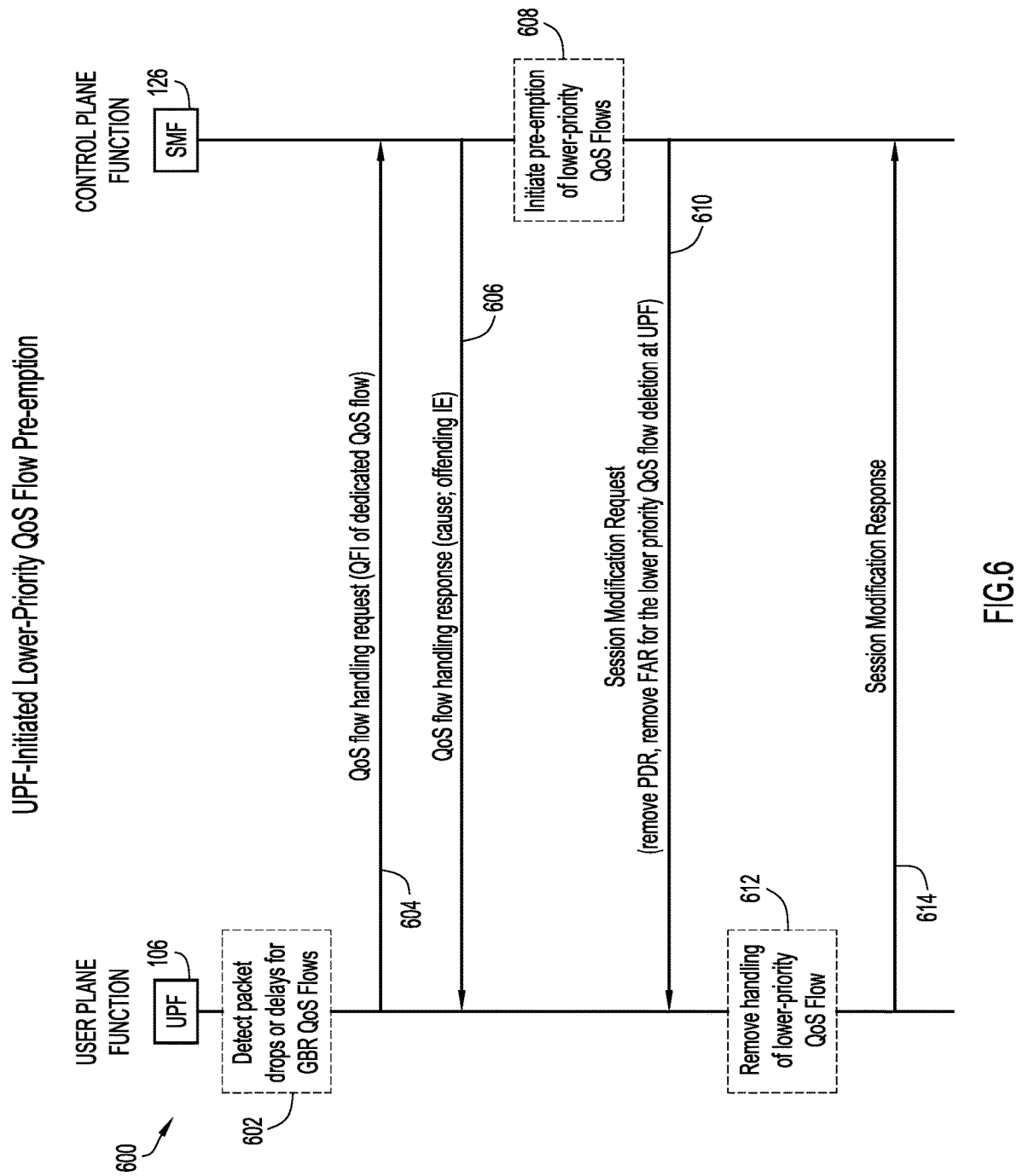
FIG. 6 is a call flow diagram for describing a call flow for QoS resource management for supporting QoS guarantees in a mobile network (e.g. an enterprise private 3GPP based network) according to some implementations of the present disclosure (e.g. a UPF-initiated lower-priority QoS Flow pre-emption procedure)

FIG. 6 is a call flow diagram 600 for describing a call flow for QoS resource management for supporting QoS guarantees in a mobile network (e.g. the enterprise private 3GPP based network of FIGS. 1A-1B) according to some implementations of the present disclosure. The call flow of FIG. 6 is in accord with the methods described in relation to the flowcharts of FIGS. 4 and 5. In some implementations, the call flow of FIG. 6 may be and/or be referred to as a UPF-initiated lower-priority QoS Flow pre-emption procedure.

Initially, UPF 106 may operate to forward traffic for an application for a UE in a dedicated QoS Flow. The dedicated QoS Flow may be associated with at least one of a GBR, a GFBR, or a PDB. UPF 106 may monitor (regularly or continually) traffic for these types of flows for detecting packet drops or delays. Sometime during operation, UPF 106 detect a packet loss or delay associated with the traffic that is outside a limit set by a threshold value (step 602 of FIG. 6). In some implementations, UPF 106 may determine, based on the detecting, that the GBR, GBFR, or PDB of the dedicated QoS Flow may have been (or e.g. has been) compromised. This determination may be indicative of congestion or overload at UPF 106. Again, this detection or determination may apply to those QoS Flows being maintained within their own limit (e.g. within its GBR limits).

In response, UPF 106 may send, to SMF 126 based on the detecting, a message which indicates a request for QoS Flow handling due to flow degradation (step 604 of FIG. 6). In some implementations, the request may indicate or be referred to as a flow degradation notification. The message may include information associated with the dedicated QoS Flow. In some implementations, the information in the message of step 604 may include at least a QFI associated with the dedicated QoS Flow. In response to sending the message in step 604, SMF 126 may send, to UPF 106, a message which indicates a response for the QoS Flow handling (step 606 of FIG. 6). In some implementations, the message of step 606 may merely serve as an acknowledgement to the message of step 604. In other implementations, the message of step 606 may include information associated with the packet loss or delay, for example, at least one of a cause of the packet loss or delay or an identifier of an offending QoS Flow at the user plane function.

In some implementations, the information in the message of step 604 to SMF 126 may additionally or alternatively include one or more values indicative of the packet loss or delay of the traffic, where SMF 126 may determine, based on the one or more received values, that the GBR, GBFR, or PDB of the dedicated QoS Flow may have been (or e.g. has been) compromised. Again, this determination may include a determination that the QoS Flow is being maintained within its own limit (e.g. within its GBR limit).

In response to a determination that the GBR, GBFR, or PDB of the dedicated QoS Flow may have been (or e.g. has been) compromised, SMF 126 may initiate a function for pre-emption of lower-priority QoS Flows (step 608 of FIG. 6), for supporting the QoS guarantee for the existing dedicated QoS Flow. Here, SMF 126 may select one of a plurality of (other) QoS Flows routed via UPF 106, for deletion or for modification (downgrading or lowering) of its QoS. In one example, SMF 126 may select a lower-priority QoS Flow that has a lower priority than the dedicated QoS Flow and/or other QoS Flows routed via UPF 106. SMF 126 may send, to UPF 106, a message which indicates a session modification request, for deleting the selected QoS Flow or for modifying (downgrading or lowering) a QoS of the selected QoS Flow (step 610 of FIG. 6). UPF 106 may receive the message of step 610. In response, UPF 106 may delete or modify one or more rules of the selected QoS Flow (step 612 of FIG. 6). UPF 106 may send, to SMF 126, a message which indicates a session modification response (step 614 of FIG. 6). The deleting or downgrading of the selected QoS Flow may serve to alleviate or reduce the congestion or overload condition at UPF 106. In preferred cases, the deleting or downgrading of the selected (e.g. lower-priority) QoS Flow serves to reduce or eliminate the flow degradation of the dedicated QoS Flow.

As described above in relation to FIG. 6, SMF 126 may select a lower-priority QoS Flow that has a lower priority than the dedicated QoS Flow and/or the other QoS Flows routed via UPF 106. In one illustrative example, the plurality of QoS Flows may be respectively associated with a plurality of priority levels, where the SMF selecting is performed according to the plurality of priority levels. In another illustrative example, the plurality of QoS Flows may be respectively associated with a plurality of ARP values, where the SMF selecting is performed according to the plurality of ARP values (e.g. priority levels or "PLs"). Here, in some implementations, the QoS Flow associated with the lowest priority may be selected for deletion or for modification (downgrading or lowering) of its QoS.

As mentioned earlier above, according to some additional or alternative implementations, what is provided herein includes a "UPF-triggered QoS Flow creation procedure" and a "UPF-triggered QoS Flow deletion procedure" for optimizing use of QoS resources in the mobile network. In general, a UPF may keep an active monitoring of QoS Flows (e.g. for premium resources associated with one of a GBR, GFBR, or PDB), keeping active only those QoS Flows which have traffic activity, and deleting QoS Flows that are detected to have traffic inactivity. Such a technique may make these premium resources more readily available (e.g. not occupied by flows with low activity). Such procedures may be described in relation to FIGS. 7, 8, and 9 (UPF-triggered QoS Flow creation procedure) as well as FIGS. 10, 11, and 12 (UPF-triggered QoS Flow deletion procedure).

Figure 7:
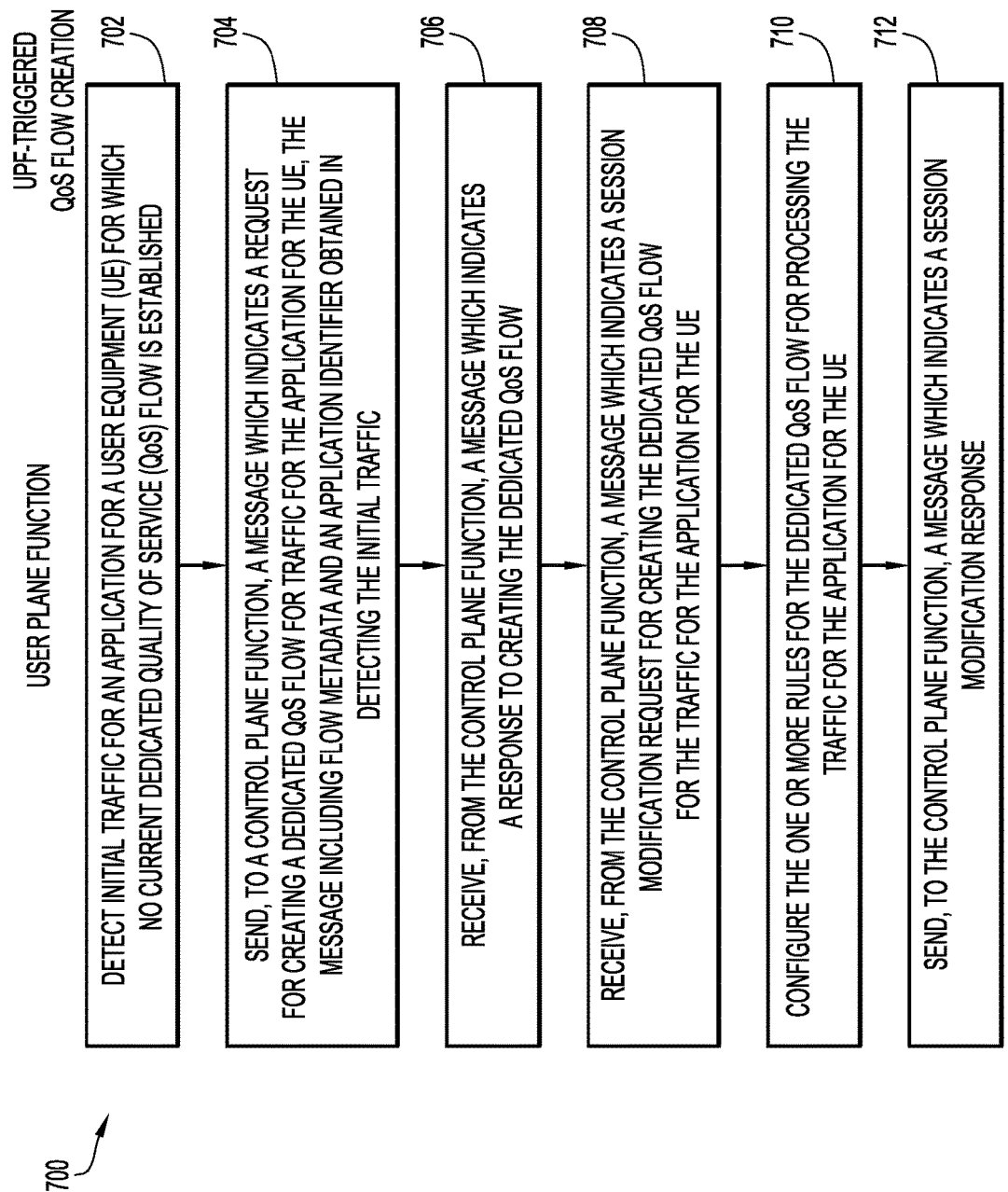
FIG. 7 is a flowchart for describing a method of QoS resource management for optimizing use of QoS resources in a mobile network (e.g. an enterprise private 3GPP based network) according to some implementations of the present disclosure, which may be performed by a UPF (e.g. as part of a UPF-triggered QoS Flow creation procedure)

FIG. 7 is a flowchart 700 for describing a method of QoS resource management for optimizing use of QoS resources in a mobile network (e.g. an enterprise private 3GPP based network) according to some implementations of the present disclosure. In some implementations, the method of FIG. 7 may be and/or be referred to as a UPF-triggered QoS Flow creation procedure. The method of FIG. 7 may be performed by a computing device or a network node configured to connect in a network for communication, to operate as a user plane function (e.g. UPF). In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the user plane function, UPF, or other function.

In general, a user plane function operates to forward traffic for applications for UEs operating in a mobile network. Initially, however, no current dedicated QoS Flow is established for traffic for an application for a particular UE which operates in the mobile network. Sometime during operation, the user plane function may detect traffic for the application for the UE for which no current dedicated QoS Flow is established (step 702 of FIG. 7). The detection of this traffic may be (e.g. only) for those applications that are configured at the user plane function by the control plane function. In some implementations, a plurality of application identifiers associated with applications (e.g. enterprise-aware or approved applications) may be configured and/or provisioned at the user plane function by the control plane function for such detection. Here, the detection of this traffic may include matching a detected application identifier with one of the pre-configured application identifiers.

The user plane function may forward this detected (e.g. initial or startup) traffic in a default QoS Flow of the UE (e.g. a previously-established default QoS Flow). In response to the detection of the traffic, the user plane function may send, to a control plane function, a message which indicates a request for creating a dedicated QoS Flow for traffic for the application for the UE (step 704 of FIG. 7). The message may include flow metadata (e.g. n-tuple flow metadata) and an application identifier obtained in detecting the initial traffic. The detection may involve the use of deep packet inspection (DPI) or the like. The user plane function may receive, from the control plane function, a message which indicates a response to creating the dedicated QoS Flow (step 706 of FIG. 7). In some implementations, the message of step 706 may merely serve as an acknowledgement to the message of step 704.

Then, a dedicated QoS Flow may be created for the traffic for the application for the UE based on a selected QoS policy associated with the application identifier. The selected QoS policy may be a selected one of a plurality of QoS policies, where each QoS policy is associated with a respective one of a plurality of 5QIs. Here, the user plane function may receive, from the control plane function, a message which indicates a session modification request for creating the dedicated QoS Flow for the traffic for the application for the UE (step 708 of FIG. 7). The message may include one or more rules associated with the selected QoS policy for the dedicated QoS Flow. The user plane function may configure the one or more rules for the dedicated QoS Flow, for processing the traffic for the application for the UE (step 710 of FIG. 7). For example, the one or more rules for configuration may include a Packet Detection Rule (PDR) and/or a Forward Action Rule (FAR). The user plane function may send, to the control plane function, a message which indicates a session modification response (step 712 of FIG. 7).

Figure 8:
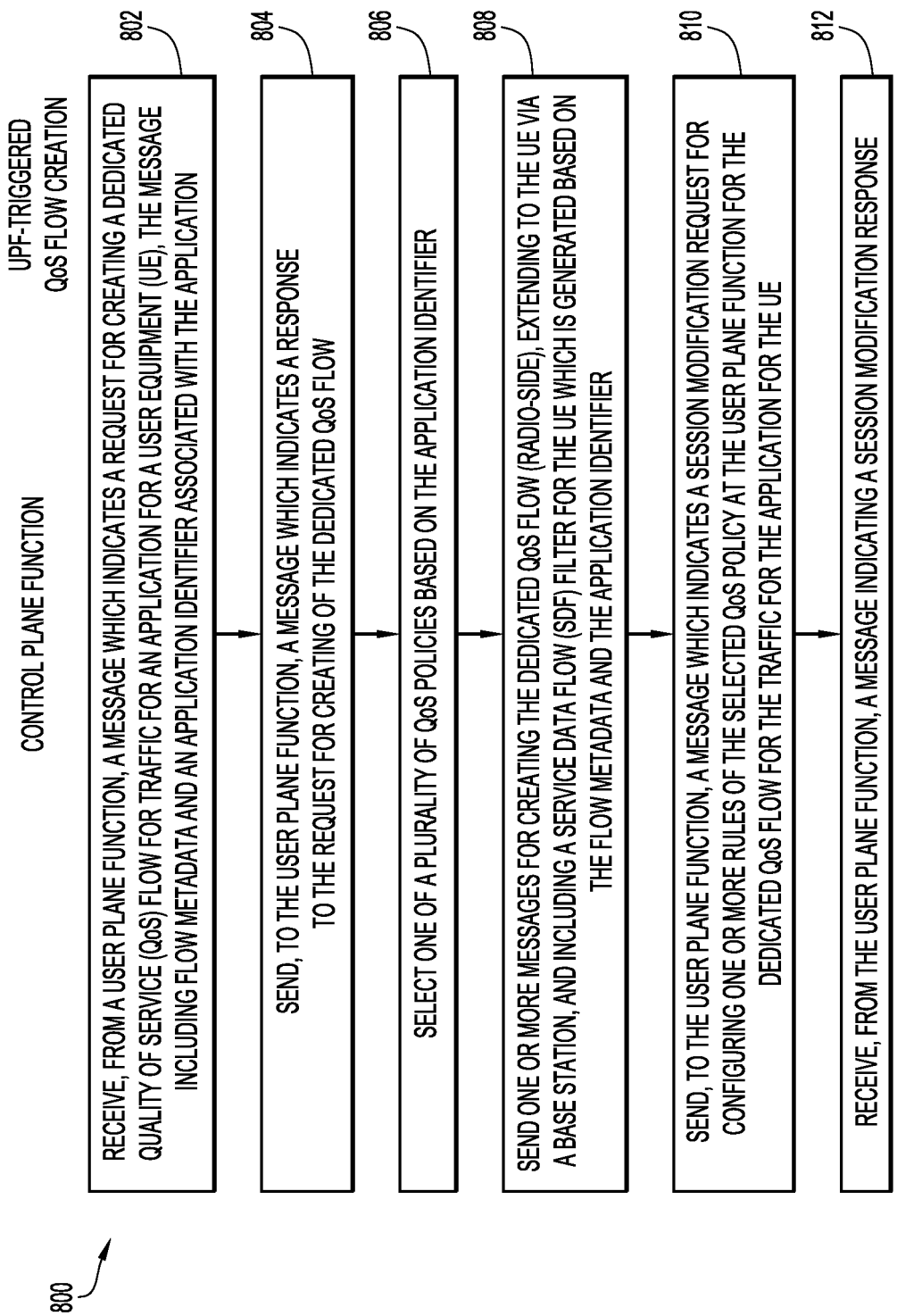
FIG. 8 is a flowchart for describing a method of QoS resource management for optimizing use of QoS resources in a mobile network (e.g. an enterprise private 3GPP based network) according to some implementations of the present disclosure, which may be performed by an SMF in cooperation with the method at the UPF of FIG. 7 (e.g. as part of a UPF-triggered QoS Flow creation procedure)

FIG. 8 is a flowchart 800 for describing a method of QoS resource management for optimizing use of QoS resources in a mobile network (e.g. an enterprise private 3GPP based network) according to some implementations of the present disclosure. In some implementations, the method of FIG. 8 may be and/or be referred to as a UPF-triggered QoS Flow creation procedure. The method of FIG. 8 may be performed by a computing device or a network node configured to connect in a network for communication, to operate as a control plane function (e.g. SMF). The method of FIG. 8 which may be performed by the control plane function may be a corresponding method to the method of FIG. 7 which may be performed by the user plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the control plane function, SMF, or other function.

In general, a user plane function operates to forward traffic for applications for UEs operating in a mobile network. Initially, however, no current dedicated QoS Flow is established for traffic for an application for a particular UE which operates in the mobile network. Sometime during operation, the user plane function may detect traffic for the application for the UE for which no current dedicated QoS Flow is established. In response, the control plane function may receive, from a user plane function, a message which indicates a request for creating a dedicated QoS Flow for traffic for an application for a UE (step 802 of FIG. 8). Again, such detection of traffic may be (e.g. only) for those applications that the control plane function configures or provisions at the user plane function (e.g. pre-configured application identifiers for enterprise-aware or approved applications). The message may include flow metadata and an application identifier associated with the application. The flow metadata (e.g. n-tuple flow metadata) and the application identifier may be obtained from detection (e.g. DPI or the like) of this initial or startup traffic for the application for the UE. The control plane function may send, to the user plane function, a message which indicates a response to the request for creating of the dedicated QoS Flow (step 804 of FIG. 8).

The control plane function may then select one of a plurality of QoS policies based on the application identifier (step 806 of FIG. 8). The selected QoS policy may be a selected one of a plurality of QoS policies, where each QoS policy is associated with a respective one of a plurality of 5QIs. In some implementations, the control plane function may select the QoS policy based on the application identifier by consulting the mapping which is stored in memory.

The control plane function may then perform radio-side messaging for creating the dedicated QoS Flow, sending one or more messages for creating the dedicated QoS Flow, extending to UE 102 via a base station (e.g. gNB 104) to the user plane function (step 808 of FIG. 8). The one or more messages may include a service data flow (SDF) filter for the UE which may be generated based on the flow metadata and the application identifier. In addition, the control plane function may send, to the user plane function, a message which indicates a session modification request for configuring one or more rules of the selected QoS policy at the user plane function for the dedicated QoS Flow for the traffic for the application for the UE (step 810 of FIG. 8). For example, the one or more rules for configuration may include a PDR and/or an FAR. The control plane function may receive, from the user plane function, a message indicating a session modification response (step 812 of FIG. 8).

Figure 9:
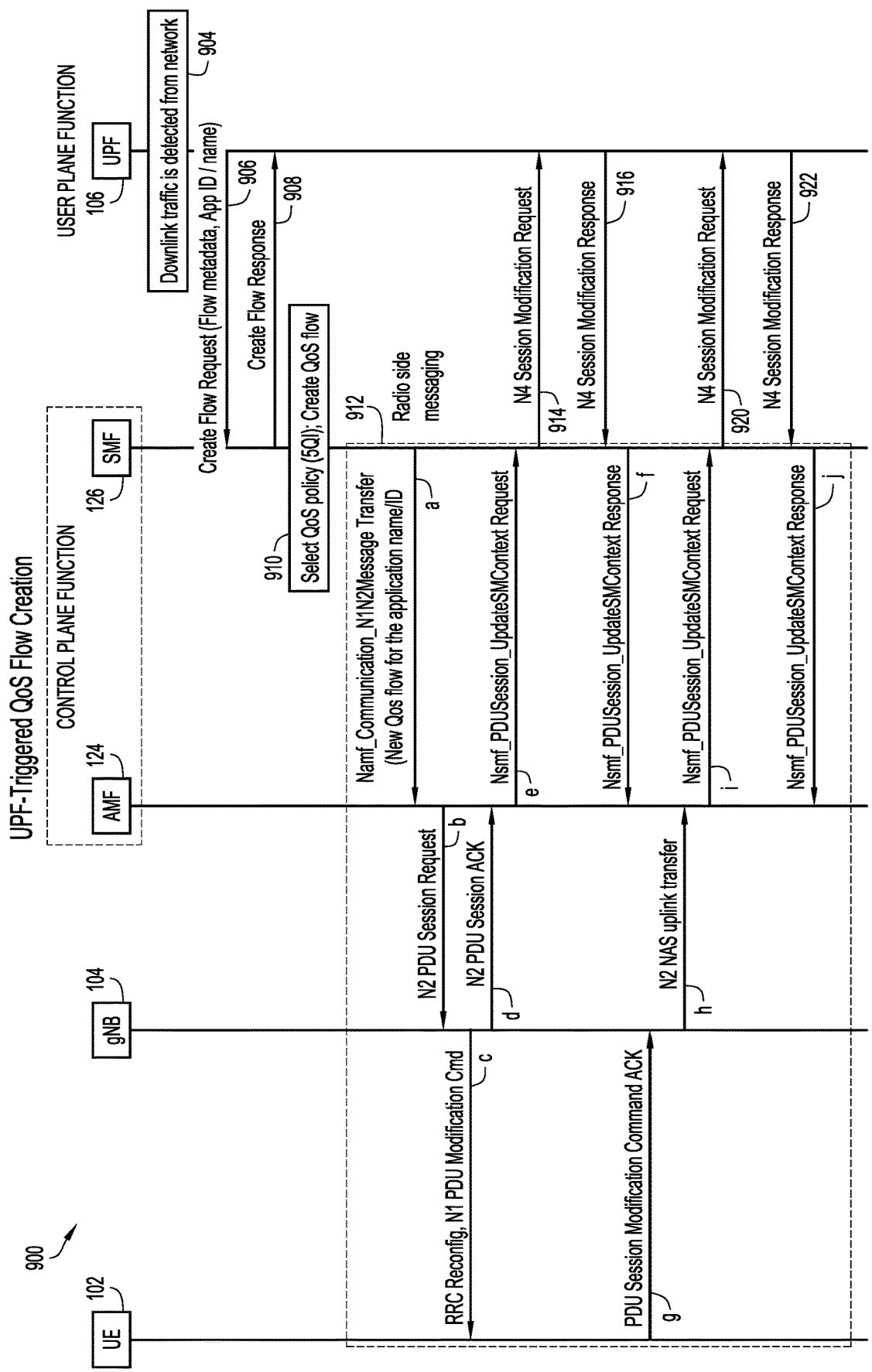
FIG. 9 is a call flow diagram for describing a call flow for QoS resource management for optimizing use of QoS resources in a mobile network (e.g. an enterprise private 3GPP based network) according to some implementations of the present disclosure (e.g. a UPF-triggered QoS Flow creation procedure)

FIG. 9 is a call flow diagram 900 for describing a call flow for QoS resource management for optimizing use of QoS resources in a mobile network (e.g. the enterprise private 3GPP based network of FIGS. 1A-1B) according to some implementations of the present disclosure. The call flow of FIG. 9 accords to the methods described in relation to the flowcharts of FIGS. 7 and 8. In some implementations, the call flow of FIG. 9 may be and/or be referred to as a UPF-triggered QoS Flow creation procedure.

In general, UPF 106 operates to forward traffic for applications for UEs operating in a mobile network. Initially, however, no current dedicated QoS Flow is established for traffic for an application for a particular UE (i.e. UE 102) which operates in the mobile network. Sometime during operation, UPF 106 may detect traffic for the application for UE 102 for which no current dedicated QoS Flow is established (step 904 of FIG. 9). Again, such detection of traffic may be (e.g. only) for those applications that SMF 126 configures or provisions at UPF 106 (e.g. pre-configured application identifiers for enterprise-aware or approved applications). UPF 106 may forward this (e.g. initial or startup) traffic in a default QoS Flow of UE 102 (e.g. a previously-established default QoS Flow). In response to the detection of the traffic, UPF 106 may send, to SMF 126, a message which indicates a request for creating a dedicated QoS Flow for traffic for the application for UE 102 (step 906 of FIG. 9). The message may include flow metadata (e.g. n-tuple flow metadata) and an application identifier obtained in detecting the initial traffic. The detection at UPF 106 may involve the use of DPI or the like. SMF 126 may receive this message and send, to UPF 106, a message which indicates a response to creating the dedicated QoS Flow (step 908 of FIG. 9). In some implementations, the message of step 908 may merely serve as an acknowledgement to the message of step 906.

Then, a new dedicated QoS Flow may be created for the traffic for the application for UE 102, which may be based on a selected QoS policy associated with the application identifier. For creating the dedicated QoS Flow, SMF 126 may select one of a plurality of QoS policies based on the application identifier (step 910 of FIG. 9). The selected QoS policy may be associated with one of a plurality of different 5QIs. In some implementations, SMF 126 may select the QoS policy based on the application identifier by consulting the mapping which is stored in memory. SMF 126 may perform radio-side messaging for creating the dedicated QoS Flow, sending one or more radio-side messages for creating the dedicated QoS Flow, which extends to UE 102 via a base station (e.g. gNB 104) to UPF 106 (step 912 of FIG. 9). The one or more messages may include an SDF filter for UE 102, which may be generated based on the flow metadata (e.g. n-tuple flow metadata) and the application identifier.

Radio-side messaging for QoS Flow creation is now generally described. SMF 126 may initiate a Namf_Communication_N1N2Message Transfer towards AMF 124 (step "a" of FIG. 9). The message transfer may include a PDU Session Modification Command, and for example, the QFI and QoS profile for the new dedicated QoS Flow. AMF 124 may send to SMF 126 an acknowledgement data notification (not shown in FIG. 9). AMF 124 may then send an N2 PDU Session Request message to gNB 104 (step "b" of FIG. 9). This message may include an N1 Session Management (SM) container which carries the PDU Session Modification Command. The gNB 104 may issue a signaling exchange with UE 102 that is related with the information received from SMF 126. Here, an RRC Connection Reconfiguration may take place with UE 102 (e.g. transporting the N1 SM container to UE 102) for modifying resources related to the PDU session (step "c" of FIG. 9). The gNB 104 may acknowledge the N2 PDU Session Request by sending an N2 PDU Session Ack message to AMF 124 (step "d" of FIG. 9). AMF 124 may forward the N2 SM information to SMF 126 via an Nsmf_PDUSession_UpdateSMContext service operation (step "e" of FIG. 9). SMF 126 may reply with an Nsmf_PDUSession_UpdateSMContext Response (step "f" of FIG. 9).

With respect to UPF 106, SMF 126 may update the N4 session of UPF 106 by sending an N4 Session Modification Request (step 914 of FIG. 9). This may be for configuring one or more rules of the selected QoS policy at UPF 106 for the dedicated QoS Flow. For example, SMF 126 may update UPF 106 with one or more UL PDRs for the new dedicated QoS Flow. This may allow UL packets with the QFI of the new QoS Flow to be communicated. UPF 106 may reply with an N4 Session Modification Response (step 916 of FIG. 9).

Continuing with the radio-side messaging after step "f", UE 102 may acknowledge the PDU Session Modification Command from step "c" by sending a NAS message to gNB 104 (step "g" of FIG. 9), which forwards the NAS message to AMF 124 (step "h" of FIG. 9). AMF 124 forwards the N1 SM container (e.g. including the PDU Session Modification Command Ack) to SMF 126 via an Nsmf_PDUSession_UpdateSMContext service operation (step "i" of FIG. 9). SMF 126 may reply with a Nsmf_PDUSession_UpdateSMContext Response (step "j" of FIG. 9).

With respect to UPF 106, SMF 126 may again update the N4 session of UPF 106 by sending an N4 Session Modification Request (step 920 of FIG. 9). UPF 106 may reply with an N4 Session Modification Response (step 922 of FIG. 9).

Figure 10:
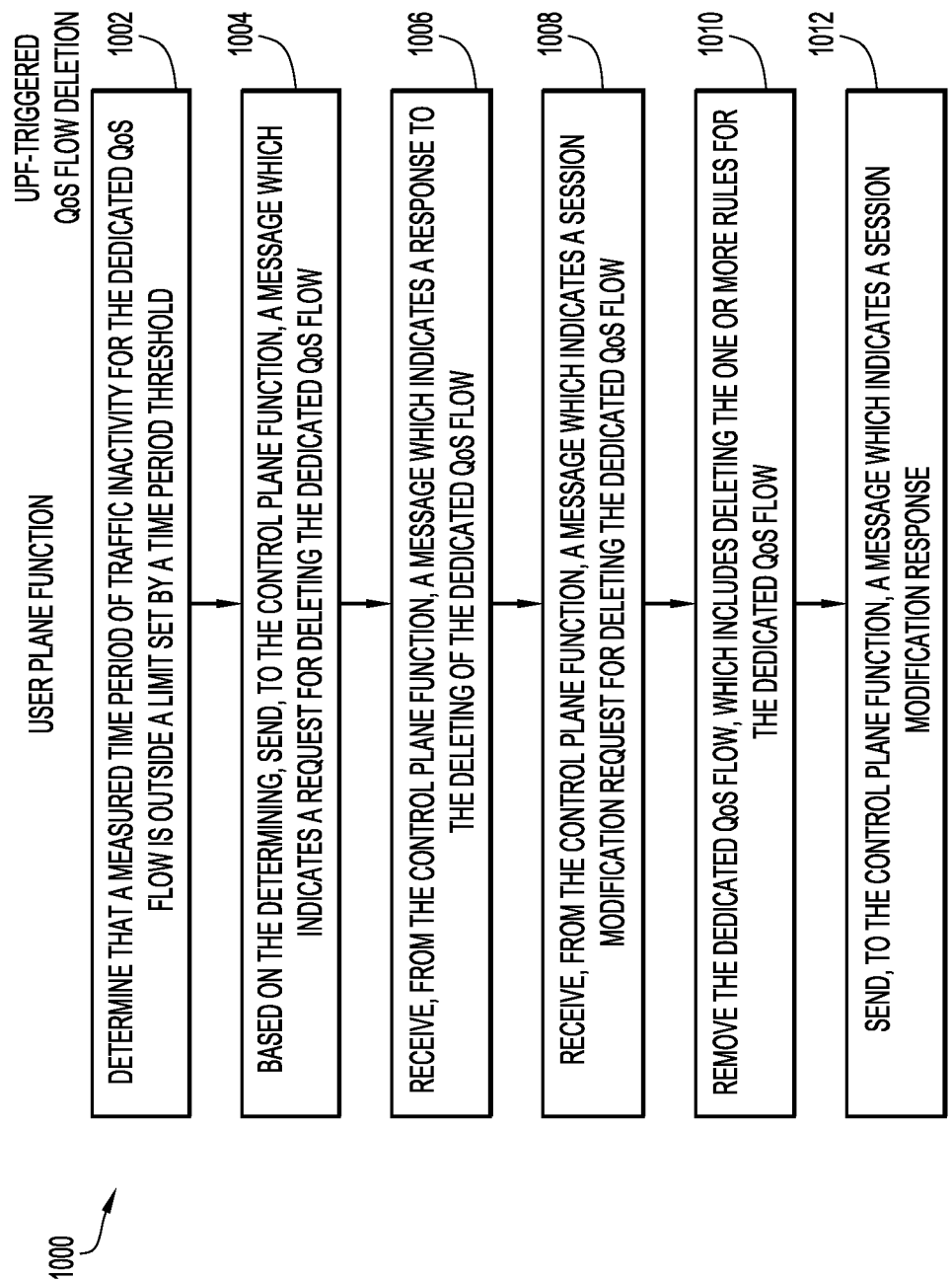
FIG. 10 is a flowchart for describing a method of QoS resource management for optimizing use of QoS resources in a mobile network (e.g. an enterprise private 3GPP based network) according to some implementations of the present disclosure, which may be performed by a UPF (e.g. as part of a UPF-triggered QoS Flow deletion procedure)

FIG. 10 is a flowchart 1000 for describing a method of QoS resource management for optimizing use of QoS resources in a mobile network (e.g. an enterprise private 3GPP based network) according to some implementations of the present disclosure. The method of FIG. 10 may be performed by a computing device or a network node configured to connect in a network for communication, to operate as a user plane function (e.g. UPF). In some implementations, the method of FIG. 10 may be and/or be referred to as a UPF-triggered QoS Flow deletion procedure. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the user plane function, UPF, or other function.

In the flowchart 1000 of FIG. 10, the user plane function may operate to forward traffic for an application for a UE in a dedicated QoS Flow. The dedicated QoS Flow may be associated with at least one of a GBR, a GFBR, or a PDB. The user plane function may monitor traffic activity/inactivity in the dedicated QoS Flow. Based on the monitoring, the user plane function may determine that a measured time period of (continuous) traffic inactivity for the dedicated QoS Flow is outside a limit set by a time period threshold (step 1002 of FIG. 10). In response to determining, the user plane function may send, to the control plane function based on the determining, a message which indicates a request for deleting the dedicated QoS Flow (step 1004 of FIG. 10). The message may include information associated with the dedicated QoS Flow for deletion. In some implementations, the information associated with the dedicated QoS Flow may include at least one of a QFI, a (control plane or "CP") Fully-Qualified Session ID (F-SEID), or a Tunnel Endpoint (TEID) associated with the dedicated QoS Flow. In response to receiving the message of step 1004, the user plane function may receive, from the control plane function, a message which indicates a response to the deleting of the dedicated QoS Flow (step 1006 of FIG. 10). In some implementations, the message of step 1006 may merely serve as an acknowledgement to the message of step 1004.

The user plane function may then receive, from the control plane function, a message which indicates a session modification request for deleting the dedicated QoS Flow (step 1008 of FIG. 10). The control plane function may issue this request based on the information received in relation to step 1004. The user plane function may remove the dedicated QoS Flow, which includes deleting the one or more rules for the dedicated QoS Flow (step 1010 of FIG. 10). For example, the one or more rules to be removed or deleted may include the PDR and/or the FAR. The user plane function may send, to the control plane function, a message which indicates a session modification response (step 1012 of FIG. 10).

It is generally intended that the time period threshold for traffic inactivity be set at a relatively small value so that the premium QoS flow resources be removed somewhat rapidly when not in use. This time period threshold for traffic inactivity is different from any session inactivity timer that may be utilized. In some implementations, the time period threshold for traffic inactivity may be a fixed and permanent value. In other implementations, the time period threshold for traffic inactivity may be variable and provisioned (e.g. dynamically assigned) at the user plane function by the control plane function. For example, the time period threshold may be selected or generated as a function of detected congestion, the number of sessions or flows, a total bandwidth, etc. (e.g. the time period threshold may be decreased according to detected congestion, etc.).

Figure 11:
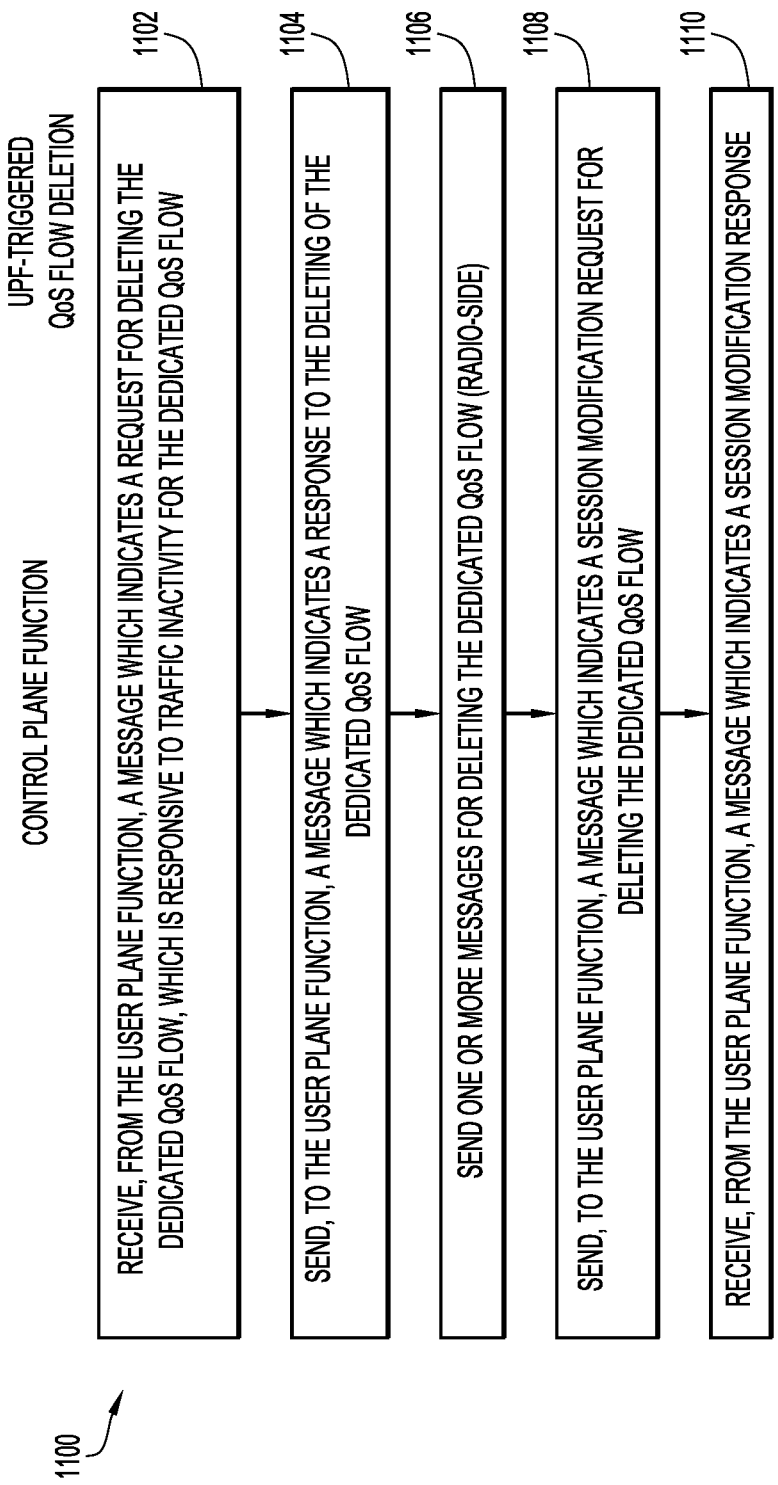
FIG. 11 is a flowchart for describing a method of QoS resource management for optimizing use of QoS resources in a mobile network (e.g. an enterprise private 3GPP based network) according to some implementations of the present disclosure, which may be performed by an SMF in cooperation with the method at the UPF of FIG. 10 (e.g. as part of a UPF-triggered QoS Flow deletion procedure)

FIG. 11 is a flowchart 1100 for describing a method of QoS resource management for optimizing use of QoS resources in a mobile network (e.g. an enterprise private 3GPP based network) according to some implementations of the present disclosure. The method of FIG. 11 may be performed by a computing device or a network node configured to connect in a network for communication, to operate as a control plane function (e.g. SMF). The method of FIG. 11 which may be performed by the control plane function may be a corresponding method to the method of FIG. 10 which may be performed by the user plane function. In some implementations, the method of FIG. 11 may be and/or be referred to as a UPF-triggered QoS Flow deletion procedure. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as the control plane function, SMF, or other function.

In the flowchart 1100 of FIG. 11, a user plane function may operate to forward traffic for an application for a UE in a dedicated QoS Flow. The dedicated QoS Flow may be associated with at least one of a GBR, a GFBR, or a PDB. The control plane function may receive, from the user plane function, a message which indicates a request for deleting the dedicated QoS Flow (step 1102 of FIG. 11). The message may be received in response to traffic inactivity for the dedicated QoS Flow that is detected at the user plane function. For example, the user plane function may monitor traffic activity/inactivity in the dedicated QoS Flow by determining whether a measured time period of traffic inactivity is outside a limit set by a time period threshold. The control plane function may send, to the user plane function, a message which indicates a response to the deleting of the dedicated QoS Flow (step 1104 of FIG. 11). In some implementations, the message of step 1104 may merely serve as an acknowledgement to the message of step 1102.

In response to the message of step 1104, the control plane function may send one or more radio-side messages for deleting the QoS Flow (step 1106 of FIG. 11). The control plane function may also send, to the user plane function, a message which indicates a session modification request for deleting the dedicated QoS Flow (step 1108 of FIG. 11). Deleting or removing the dedicated QoS Flow at the user plane function may include deleting one or more rules for the dedicated QoS Flow. For example, the one or more rules to be removed or deleted may include the PDR and/or the FAR. The control plane function may receive, from the user plane function, a message which indicates a session modification response (step 1110 of FIG. 11).

Again, it is generally intended that the time period threshold for traffic inactivity be set at a relatively small value so that the premium QoS flow resources be removed somewhat rapidly when not in use. This time period threshold for traffic inactivity is different from any session inactivity timer that may be utilized. In some implementations, the time period threshold for traffic inactivity may be a fixed and permanent value. In other implementations, the time period threshold for traffic inactivity may be variable and provisioned (e.g. dynamically assigned) at the user plane function by the control plane function. For example, the time period threshold may be selected or generated as a function of detected congestion, the number of sessions or flows, a total bandwidth, etc. (e.g. the time period threshold may be decreased according to detected congestion, etc.).

Figure 12:
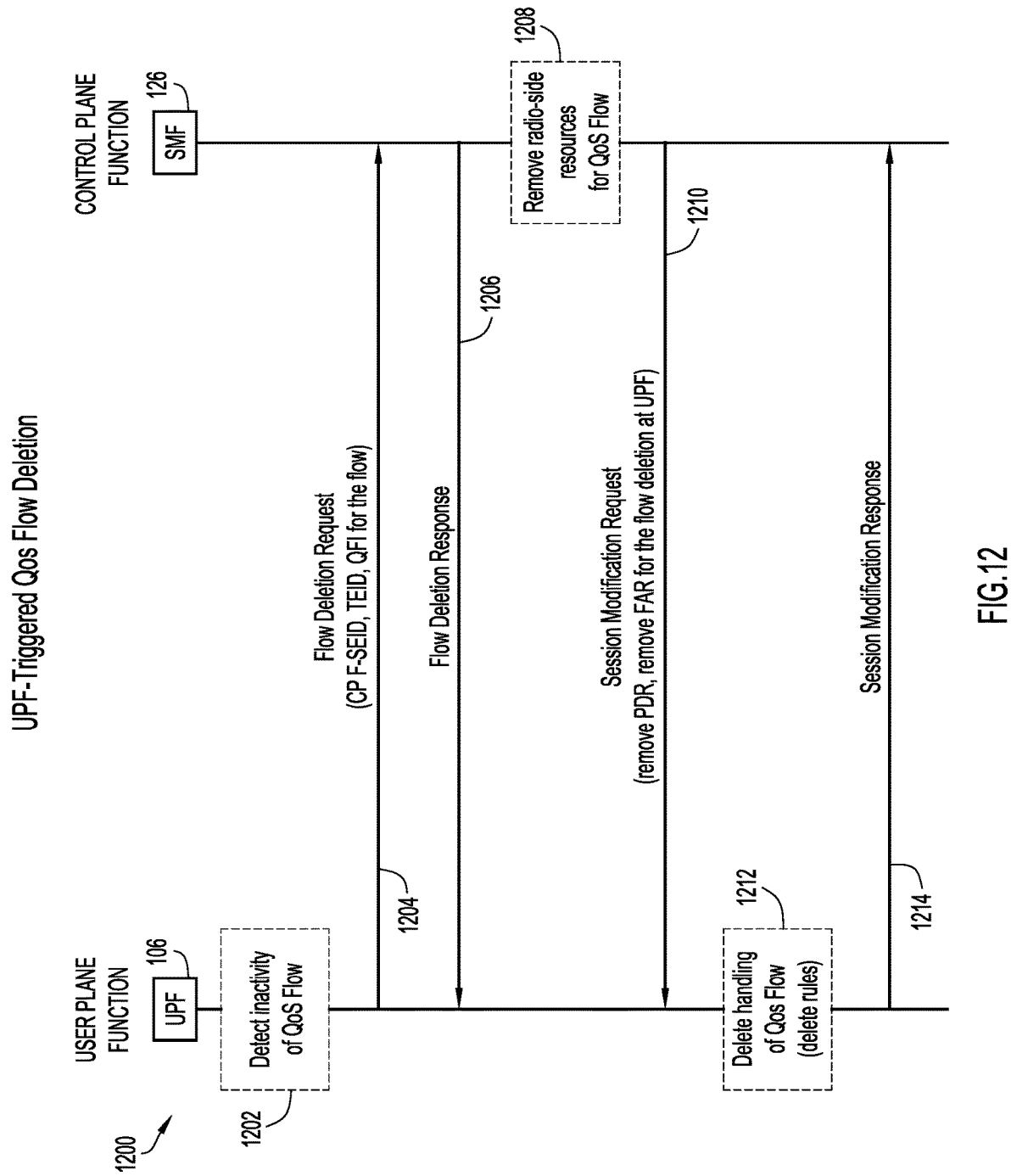
FIG. 12 is a call flow diagram for describing a call flow for QoS resource management for optimizing use of QoS resources in a mobile network (e.g. an enterprise private 3GPP based network) according to some implementations of the present disclosure (e.g. a UPF-triggered QoS Flow deletion procedure)

FIG. 12 is a call flow diagram 1200 for describing a call flow for QoS resource management for optimizing use of QoS resources in a mobile network (e.g. the enterprise private 3GPP based network of FIGS. 1A-1B) according to some implementations of the present disclosure. The call flow of FIG. 12 is in accord with the methods described in relation to the flowcharts of FIGS. 10 and 11. In some implementations, the call flow of FIG. 12 may be and/or be referred to as a UPF-triggered QoS Flow deletion procedure.

Initially, UPF 106 may operate to forward traffic for an application for a UE in a dedicated QoS Flow. The dedicated QoS Flow may be associated with at least one of a GBR, a GFBR, or a PDB. UPF 106 may monitor traffic activity/inactivity in the dedicated QoS Flow. Based on the monitoring, UPF 106 may determine that a measured time period of (continuous) traffic inactivity for the dedicated QoS Flow is outside a limit set by a time period threshold (step 1202 of FIG. 12). In response to determining, UPF 106 may send, to SMF 126 based on the determining, a message which indicates a request for deleting the dedicated QoS Flow (step 1204 of FIG. 12). The message may include information associated with the dedicated QoS Flow for deletion. In some implementations, the information associated with the dedicated QoS Flow may include at least one of a QFI, a CP F-SEID, or a TEID associated with the dedicated QoS Flow. In response to receiving the message of step 1204, UPF 106 may receive, from SMF 126, a message which indicates a response to the deleting of the dedicated QoS Flow (step 1206 of FIG. 12). In some implementations, the message of step 1206 may merely serve as an acknowledgement to the message of step 1204.

In response to the message of step 1204, SMF 126 may send one or more radio-side messages for deleting the QoS Flow (step 1208 of FIG. 12). In some implementations, this procedure or its steps may involve a standard procedure for deletion of a QoS Flow. UPF 106 may then receive, from SMF 126, a message which indicates a session modification request for deleting the dedicated QoS Flow (step 1210 of FIG. 12). Again, SMF 126 may issue this request based on the information received in relation to step 1204. UPF 106 may then remove the dedicated QoS Flow, which includes deleting the one or more rules for the dedicated QoS Flow (step 1212 of FIG. 12). For example, the one or more rules to be removed or deleted may include the PDR and/or the FAR. UPF 106 may send, to SMF 126, a message which indicates a session modification response (step 1214 of FIG. 12).

Thus, techniques and mechanisms for QoS Flow management for optimizing use of QoS resources and supporting QoS guarantees in a mobile network, such as an enterprise private 3GPP network (e.g. a private 5G network), have been described.

In one illustrative example, network operations for a UPF-initiated lower-priority QoS Flow pre-emption procedure may be performed for better support of QoS guarantees in a mobile network. A user plane function or UPF may perform operations for the UPF-initiated lower-priority QoS Flow pre-emption procedure. A method of the UPF may include forwarding traffic for an application for a UE in a dedicated QoS flow, the dedicated QoS Flow being associated with one of a GBR, GFBR, or PDB; detecting a packet loss or delay associated with the traffic for the application for the UE in the dedicated QoS Flow to be outside a limit set by a threshold value; sending, to a control plane function based on the detecting, a message which indicates a request for QoS Flow handling due to flow degradation, the message including information associated with the dedicated QoS Flow; and receiving, from the control plane function and responsive to sending the request for QoS Flow handling, a message which indicates a session modification request, for deleting a selected QoS Flow or downgrading a QoS of the selected QoS Flow. The method of the UPF may further include determining that the GBR, GBFR, or PDB of the dedicated QoS Flow has been compromised based on the detecting. The method of the UPF may further include deleting or modifying one or more rules of the selected QoS Flow; and sending, to the control plane function, a message which indicates a session modification response. The method of the UPF may further include receiving, from the control plane function, a message which indicates a response to the QoS Flow handling, where the message includes at least one of a cause and an identifier of an offending QoS Flow at the user plane function. The message which indicates the request for QoS Flow handling may include one or more values indicating the packet loss or delay of the traffic for the application for the UE in the dedicated QoS Flow. The information associated with the dedicated QoS Flow may include at least a QFI. The selected QoS Flow may be indicated as a lower-priority QoS Flow. The UPF and the control plane function may be configured for use in an enterprise private 3GPP based network.

A control plane function or SMF may perform corresponding operations for the UPF-initiated lower-priority QoS Flow pre-emption procedure. A method of the SMF may include managing a session at a user plane function which is configured to forward traffic for an application for a UE in a dedicated QoS flow, the dedicated QoS Flow being associated with one of a GBR, GFBR, or PDB; receiving, from the user plane function, a message which indicates a request for QoS Flow handling due to flow degradation, the message including information associated with the dedicated QoS Flow and indicating that the traffic has a packet loss or delay that is outside a limit set by a threshold value; selecting one of a plurality of QoS Flows which are routed via the user plane function; and sending, to the user plane function, a message which indicates a session modification request for deleting the selected QoS Flow or downgrading a QoS of the selected QoS Flow. The plurality of QoS Flows may be respectively associated with a plurality of priority levels, the selecting may be based on the plurality of priority levels, and the selected QoS Flow may comprise a lower-priority QoS Flow having a lower priority than one or more other QoS Flows. In particular, the plurality of QoS Flows may be respectively associated with a plurality of ARP values, the selecting may be based on the plurality of ARP values, and the selected QoS Flow may comprise a lower-priority QoS Flow having a lower priority than one or more other QoS Flows. The message may further indicate that the GBR, GBFR, or PDB of the dedicated QoS Flow may have been compromised, where the SMF may further include sending, to the user plane function, a message which indicates a response for QoS Flow handling which includes at least one of a cause and an identifier of an offending QoS Flow; and receiving, from the user plane function, a message which indicates a session modification response. The message may further include one or more values indicating the packet loss or delay of the traffic, and the method of the SMF may further include determining that the GBR, GBFR, or PDB of the dedicated QoS Flow has been compromised based on the one or more values indicating the packet loss or delay of the traffic.

In another illustrative example, network operations may be performed for a UPF-triggered QoS Flow creation procedure for optimizing use of QoS resources in a mobile network. In general, the UPF may keep an active monitoring of QoS Flows (e.g. those associated with one of a GBR, GFBR, or PDB), keeping active only those QoS Flows which have traffic activity, and deleting QoS Flows that are detected to have traffic inactivity. A user plane function or UPF may perform operations for the UPF-triggered QoS Flow creation procedure. A method of the UPF may include detecting initial traffic for an application for a UE for which no current dedicated QoS flow is established; and sending, to a control plane function, a message which indicates a request for creating a dedicated QoS Flow for traffic for the application for the UE, where the message includes flow metadata and an application identifier obtained in detecting the initial traffic. The dedicated QoS Flow may be created for the traffic for the application for the UE based on a selected QoS policy associated with the application identifier. The selected QoS policy may comprise a selected one of a plurality of QoS policies, where each QoS policy is associated with a respective one of a plurality of 5QIs. The method of the UPF may include forwarding the initial traffic on a current default or best effort QoS Flow of the UE. The method of the UPF may include receiving, from the control plane function, a message which indicates a response to creating the dedicated QoS Flow for the traffic for the application for the UE. The method of the UPF may include receiving, from the control plane function, a message which indicates a session modification request for creating the dedicated QoS Flow for the traffic for the application for the UE, where the message which indicates the session modification request includes one or more rules associated with the selected QoS policy for the dedicated QoS Flow; configuring the one or more rules for the dedicated QoS Flow for processing the traffic for the application for the UE; and sending, to the control plane function, a message which indicates a session modification response. The method of the UPF may include determining that a measured time period of traffic inactivity for the dedicated QoS Flow is outside a limit set by a time period threshold; and based on the determining, sending, to the control plane function, a message which indicates a request for deleting the dedicated QoS Flow. The method of the UPF may include receiving, from the control plane function, a message which indicates a session modification request for deleting the dedicated QoS Flow; removing the dedicated QoS Flow, which includes deleting the one or more rules for the dedicated QoS Flow; and sending, to the control plane function, a message which indicates a session modification response. The flow metadata may comprise n-tuple flow metadata obtained from detecting the initial traffic. The method of the UPF may include matching the application identifier with one of a plurality of configured application identifiers that are configured at the user plane function.

A control plane function or SMF may perform corresponding operations for the UPF-triggered QoS Flow creation procedure. A method of the SMF may include receiving, from a user plane function, a message which indicates a request for creating a dedicated QoS flow for traffic for an application for a UE, the message including flow metadata and an application identifier associated with the application; selecting one of a plurality of QoS policies based on the application identifier; and sending, to the user plane function, a message which indicates a session modification request for configuring one or more rules of the selected QoS policy at the user plane function for the dedicated QoS Flow for the traffic for the application for the UE. The flow metadata and the application identifier associated with the application may be obtained from initial traffic for the application for the UE, detected at the user plane function, for which no current dedicated QoS Flow exists. The flow metadata may comprise n-tuple flow metadata obtained from the initial traffic. The selected QoS policy may comprise a selected one of a plurality of QoS policies, where each QoS policy is associated with a respective one of a plurality of 5QIs. The method of the SMF may further include sending one or more messages for creating the dedicated QoS Flow extending to the UE via a base station, including a SDF filter for the UE which is generated based on the flow metadata and the application identifier. The method of the SMF may further include receiving, from the user plane function, a message indicating a session modification response. The method of the SMF may further include receiving, from the user plane function, a message which indicates a request for deleting the dedicated QoS Flow, which is responsive to traffic inactivity for the dedicated QoS Flow; sending, to the user plane function, a message which indicates a session modification request for deleting the dedicated QoS Flow; and receiving, from the user plane function, a message which indicates a session modification response.

Figure 13:
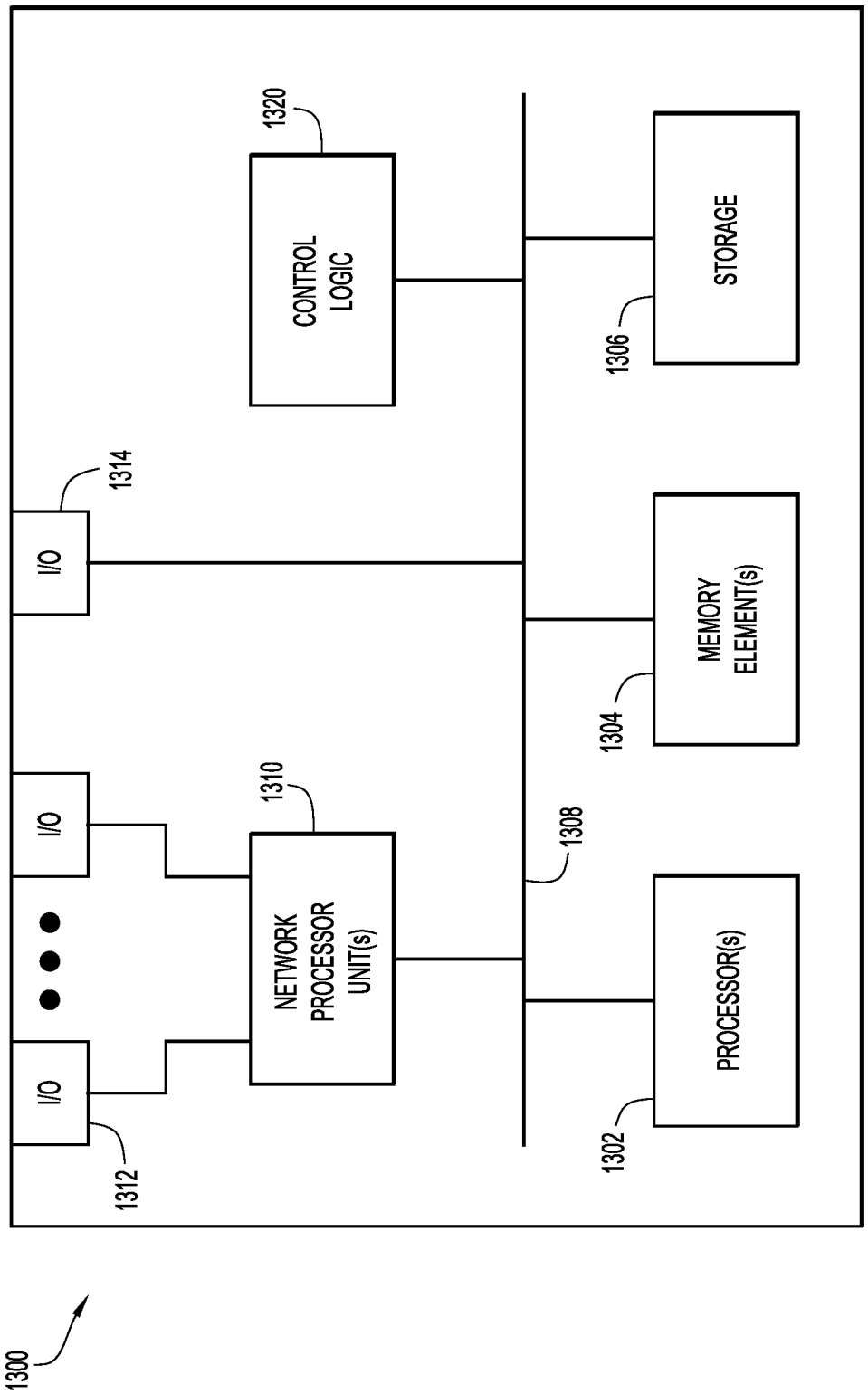
FIG. 13 illustrates a hardware block diagram of a computing device that may perform functions associated with operations discussed herein.

FIG. 13 illustrates a hardware block diagram of a computing device 1300 that may perform functions associated with operations discussed herein in connection with the techniques described in relation to the above figures, especially in relation to FIGS. 3-12. In various embodiments, a computing device, such as computing device 1300 or any combination of computing devices 1300, may be configured as any entity/entities as discussed for the techniques depicted in connection with the figures in order to perform operations of the various techniques discussed herein.

In at least one embodiment, the computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computer device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method comprising:
    at a user plane function,
        forwarding traffic for an application for a user equipment (UE) in a dedicated Quality of Service (QoS) flow, the dedicated QoS Flow being associated with one of a Guaranteed Bit Rate (GBR), a Guaranteed Flow Bit Rate (GFBR), or a Packet Delay Budget (PDB);
        detecting a packet loss or delay associated with the traffic for the application for the UE in the dedicated QoS Flow to be outside a limit set by a threshold value;
        sending, to a control plane function based on the detecting, a message which indicates a request for QoS Flow handling due to flow degradation, the message including information associated with the dedicated QoS Flow; and
        receiving, from the control plane function and responsive to sending the request for QoS Flow handling due to flow degradation, a message which indicates a session modification request, for deleting a selected QoS Flow or downgrading a QoS of the selected QoS Flow.

2. The method of claim 1, further comprising:
    at the user plane function,
        determining that the GBR, GBFR, or PDB of the dedicated QoS Flow has been compromised based on the detecting.

3. The method of claim 1, further comprising:
    at the user plane function,
        deleting or modifying one or more rules of the selected QoS Flow; and
        sending, to the control plane function, a message which indicates a session modification response.

4. The method of claim 1, further comprising:
    at the user plane function,
        receiving, from the control plane function, a message which indicates a response to the QoS Flow handling, the message including at least one of a cause and an identifier of an offending QoS Flow at the user plane function.

5. The method of claim 1, wherein the message further includes one or more values indicating the packet loss or delay of the traffic for the application for the UE in the dedicated QoS Flow.

6. The method of claim 1, wherein:
    the information associated with the dedicated QoS Flow includes at least a QoS Flow Identifier (QFI) of the dedicated QoS Flow,
    the selected QoS Flow is indicated as a lower-priority QoS Flow, and
    the user plane function is configured for use in an enterprise private Third Generation Partnership Project (3GPP) based network.

7. A method comprising:
    at a control plane function,
        managing a session at a user plane function which is configured to forward traffic for an application for a user equipment (UE) in a dedicated Quality of Service (QoS) flow due to flow degradation, the dedicated QoS Flow being associated with one of a Guaranteed Bit Rate (GBR), a Guaranteed Flow Bit Rate (GFBR), or a Packet Delay Budget (PDB);
        receiving, from the user plane function, a message which indicates a request for QoS Flow handling, the message including information associated with the dedicated QoS Flow and indicating that the traffic has a packet loss or delay that is outside a limit set by a threshold value;
        selecting one of a plurality of QoS Flows which are routed via the user plane function; and
        sending, to the user plane function, a message which indicates a session modification request for deleting the selected QoS Flow or downgrading a QoS of the selected QoS Flow.

8. The method of claim 7, wherein:
    the plurality of QoS Flows are respectively associated with a plurality of priority levels,
    the selecting is based on the plurality of priority levels, and
    the selected QoS Flow comprises a lower-priority QoS Flow having a lower priority than one or more other QoS Flows.

9. The method of claim 7, wherein:
the plurality of QoS Flows are respectively associated with a plurality of allocation and retention priority (ARP) values,
the selecting is based on the plurality of ARP values, and
the selected QoS Flow comprises a lower-priority QoS Flow having a lower priority than one or more other QoS Flows.

10. The method of claim 7, wherein the message further indicates that the GBR, GBFR, or PDB of the dedicated QoS Flow may have been compromised, the method further comprising:
at the control plane function,
sending, to the user plane function, a message which indicates a response for QoS Flow handling which includes at least one of a cause and an identifier of an offending QoS Flow; and
receiving, from the user plane function, a message which indicates a session modification response.

11. The method of claim 7, where the message further includes one or more values indicating the packet loss or delay of the traffic, the method further comprising:
at the control plane function,
determining that the GBR, GBFR, or PDB of the dedicated QoS Flow has been compromised based on the one or more values indicating the packet loss or delay of the traffic.

12. A method comprising:
at a user plane function,
detecting initial traffic for an application for a user equipment (UE) for which no current dedicated Quality of Service (QoS) flow is established; and
sending, to a control plane function, a message which indicates a request for creating a dedicated QoS Flow for traffic for the application for the UE, the message including flow metadata and an application identifier obtained in detecting the initial traffic,
wherein the dedicated QoS Flow is created for the traffic for the application for the UE based on a selected QoS policy associated with the application identifier.

13. The method of claim 12, wherein the selected QoS policy comprises a selected one of a plurality of QoS policies, each QoS policy being associated with a respective one of a plurality of 5G QoS Indicators (5QIs).

14. The method of claim 12, further comprising:
at the user plane function,
forwarding the initial traffic on a current default or best effort QoS Flow of the UE.

15. The method of claim 12, further comprising:
at the user plane function,
receiving, from the control plane function, a message which indicates a response to creating the dedicated QoS Flow for the traffic for the application for the UE.

16. The method of claim 12, further comprising:
at the user plane function,
receiving, from the control plane function, a message which indicates a session modification request for creating the dedicated QoS Flow for the traffic for the application for the UE, the message which indicates the session modification request including one or more rules associated with the selected QoS policy for the dedicated QoS Flow;
configuring the one or more rules for the dedicated QoS Flow for processing the traffic for the application for the UE; and
sending, to the control plane function, a message which indicates a session modification response.

17. The method of claim 12, further comprising:
at the user plane function,
determining that a measured time period of traffic inactivity for the dedicated QoS Flow is outside a limit set by a time period threshold; and
based on the determining, sending, to the control plane function, a message which indicates a request for deleting the dedicated QoS Flow.

18. The method of claim 17, further comprising:
at the user plane function,
receiving, from the control plane function, a message which indicates a session modification request for deleting the dedicated QoS Flow;
removing the dedicated QoS Flow, which includes deleting one or more rules for the dedicated QoS Flow; and
sending, to the control plane function, a message which indicates a session modification response.

19. The method of claim 12, wherein the flow metadata comprises n-tuple flow metadata obtained from detecting the initial traffic.

20. The method of claim 12, further comprising:
at the user plane function,
matching the application identifier with one of a plurality of configured application identifiers that are configured at the user plane function.

21. A method comprising:
at a control plane function,
receiving, from a user plane function, a message which indicates a request for creating a dedicated Quality of Service (QoS) flow for traffic for an application for a user equipment (UE), the message including flow metadata and an application identifier associated with the application;
selecting one of a plurality of QoS policies based on the application identifier; and
sending, to the user plane function, a message which indicates a session modification request for configuring one or more rules of the selected QoS policy at the user plane function for the dedicated QoS Flow for the traffic for the application for the UE.

22. The method of claim 21, wherein the flow metadata and the application identifier associated with the application are obtained from initial traffic for the application for the UE, detected at the user plane function, for which no current dedicated QoS Flow exists.

23. The method of claim 22, wherein the flow metadata comprises n-tuple flow metadata obtained from the initial traffic.

24. The method of claim 21, wherein the selected QoS policy comprises a selected one of a plurality of QoS policies, each QoS policy being associated with a respective one of a plurality of 5G QoS Indicators (5QIs).

25. The method of claim 21, further comprising:
at the control plane function,
sending one or more messages for creating the dedicated QoS Flow extending to the UE via a base station, including a service data flow (SDF) filter for the UE which is generated based on the flow metadata and the application identifier.

26. The method of claim 21, further comprising:
at the control plane function,
receiving, from the user plane function, a message indicating a session modification response.

27. The method of claim 21, further comprising:
at the control plane function,
- receiving, from the user plane function, a message which indicates a request for deleting the dedicated QoS Flow, which is responsive to traffic inactivity for the dedicated QoS Flow;
- sending, to the user plane function, a message which indicates a session modification request for deleting the dedicated QoS Flow; and
- receiving, from the user plane function, a message which indicates a session modification response.

\* \* \* \* \*